(12) United States Patent
Kyotani

(10) Patent No.: US 7,238,392 B2
(45) Date of Patent: Jul. 3, 2007

(54) CONVEYANCE METHOD AND APPARATUS FOR PROCESSING STEP

(75) Inventor: Hisashi Kyotani, Shiga (JP)

(73) Assignees: Taikisha Ltd., Tokyo (JP); Daifuku Co., Ltd., Osaka (JP)

( * ) Notice: Subject to any disclaimer, the term of this patent is extended or adjusted under 35 U.S.C. 154(b) by 272 days.

(21) Appl. No.: 10/917,603

(22) Filed: Aug. 13, 2004

(65) Prior Publication Data

US 2005/0061239 A1   Mar. 24, 2005

(30) Foreign Application Priority Data

Aug. 13, 2003 (JP) .............................. 2003-292690
Aug. 13, 2003 (JP) .............................. 2003-292691
Aug. 13, 2003 (JP) .............................. 2003-292692

(51) Int. Cl.
*B05D 1/18* (2006.01)

(52) U.S. Cl. .................... 427/430.1; 427/435; 118/423

(58) Field of Classification Search ................ 118/423; 198/346.3, 465.4, 817, 466.1; 134/119, 120, 134/166 R, 22.1, 26; 204/198, 199, 479, 204/625; 427/430.1, 435–438
See application file for complete search history.

(56) References Cited

U.S. PATENT DOCUMENTS 4,772,374 A   9/1988   Urquhart et al.

6,673,153 B2   1/2004   Ehrenleitner et al.
6,676,755 B2   1/2004   Ehrenleitner et al.

FOREIGN PATENT DOCUMENTS

| DE | 201 05 676 U1 | 6/2001 |
|---|---|---|
| GB | 2236734 | 4/1991 |
| JP | 60122626 | 7/1985 |
| WO | WO 02/053482 A1 | 7/2002 |
| WO | WO 03/076080 A1 | 9/2003 |
| WO | WO 03/076316 | 9/2003 |

*Primary Examiner*—Brenda A. Lamb
(74) *Attorney, Agent, or Firm*—D. Peter Hochberg; Sean Mellino

(57) ABSTRACT

A swinging link mechanism, provided on a conveyance truck, for raising and lowering a vehicle body held on a supporting member includes a first arm having a fixed end section which is attached to the conveyance truck in a vertically rotatable manner by means of a horizontally oriented support axle, a second arm having a fixed end section supported rotatably on the free end section of the first arm and having a supporting member provided on the free end section thereof, and a third arm coupled rotatably between the conveyance truck and a prescribed position on the second arm. Third arm is caused to rotate the second arm in the opposite direction to the first arm in response to rotation of the first arm, thereby to make the lower movement path of the supporting member to extend substantially vertically. Hence, the vehicle body can be raised or lowered in a substantially vertical movement path, and the position and attitude of the vehicle body can be controlled readily, by adopting a link mechanism of a simple configuration.

13 Claims, 16 Drawing Sheets

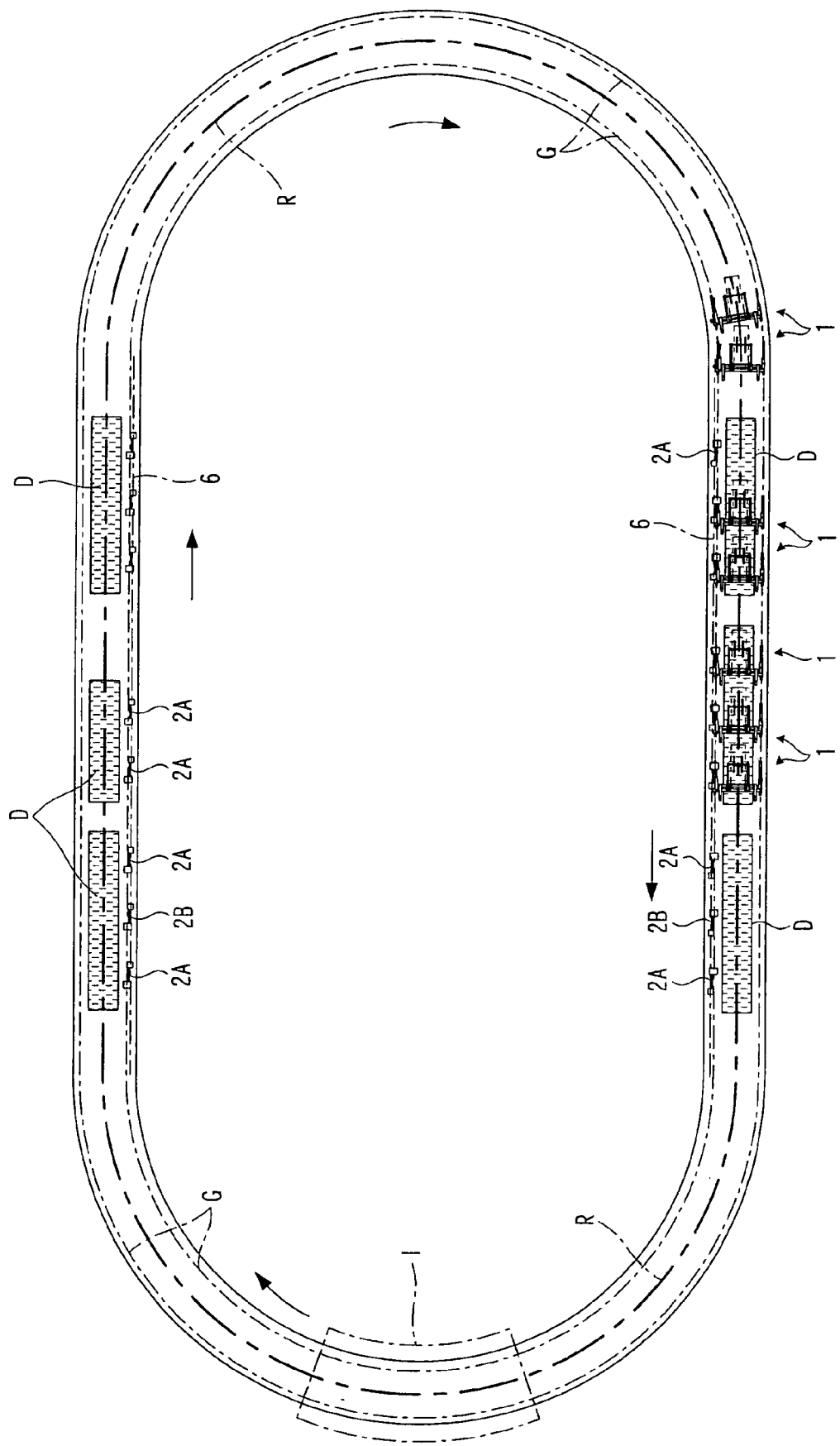

F I G. 1 3
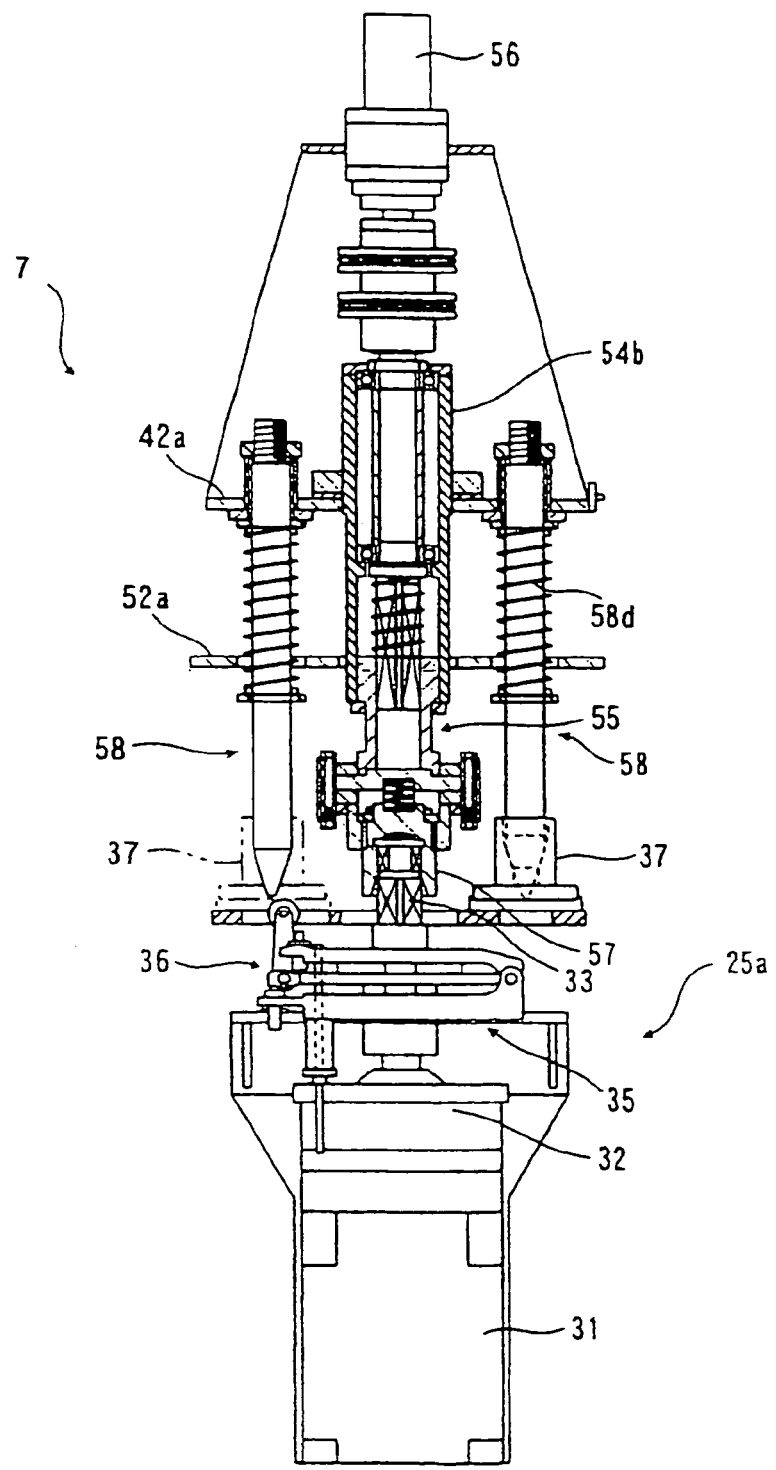

CONVEYANCE METHOD AND APPARATUS FOR PROCESSING STEP

BACKGROUND OF THE INVENTION

1. Field of the Invention

The present invention relates to a conveyance method and apparatus for a processing step, used in a conveyance line in which processing is carried out, such as a coating line or a machining line, or the like, in a manufacturing plant.

2. Description of the Related Art

A prior art example of a conveyance apparatus whereby a vehicle body is coated whilst being conveyed is disclosed in International Patent WO 02/053482. This conveyance apparatus is provided with a conveyance truck that is able to travel over immersion tanks, and pairs of swinging arms are provided on the conveyance truck, as two sets, at the front section and at the rear section in the direction of travel. Supporting bars are installed respectively between the free end sections of the pairs of swinging arms, and a vehicle body is supported on top of the front side supporting bar and the rear side supporting bar. By causing the front and rear side swinging arms to rotate downwards, in either an independent fashion or a mutually combined fashion, the vehicle body held on the supporting bars is caused to descend and is immersed in a treatment liquid.

However, in the prior art described above, since the vehicle body is raised and lowered along an arc-shaped path of descent, then it is necessary to form the entrance to the immersion tank and the exit from same, to a large dimension in the direction of travel of the conveyance truck. Moreover, if the vehicle body is to be lowered in a perpendicular vertical direction, then it is necessary to move the conveyance truck in the direction of travel. Furthermore, if the direction of descent and ascent is an arc-shaped direction, then a problem arises in that the positional control of the vehicle body, and the control of the angular position of the vehicle body with respect to its angular position when immersed in the treatment liquid and its angular position when removed from same, become complicated.

Therefore, it is an object of the present invention to provide a conveyance method and apparatus for use in processing stages, whereby the positional control of the conveyed object is simplified, and the raising and lowering operations for carrying out processing can be executed by means of simple controls, by causing the conveyed object to be raised and lowered along a movement path that is more proximate to a perpendicular vertical path.

SUMMARY OF THE INVENTION

The invention according to a preferred embodiment is a conveyance method for a processing step wherein, when a movable body is caused to move along a processing line in which processing liquid tanks are disposed at prescribed positions, a supporting body is raised and lowered by means of a swinging link mechanism provided swingably in the upward and downward directions about a support axle on the movable body, and a conveyed object supported on the supporting body is introduced into a processing liquid in a processing liquid tank and the conveyed object is thereby processed; in the swinging link mechanism, a first arm supported rotatably in the upward and downward direction on the support axle is caused to rotate in the upward and downward direction, in addition to which a second arm supported rotatably on the free end section of the first arm is rotated by means of a third arm coupled to the movable body and a prescribed position of the second arm, and the supporting body provided on the free end section of the second arm is raised and lowered following a movement path that traces a substantially vertical direction, thereby introducing same into, and removing same from, the processing liquid in the processing liquid tank.

According to the invention described in a preferred embodiment, it is possible to cause the second arm, which is raised and lowered in combination with the first arm due to the swinging link mechanism, to rotate in a prescribed direction, by means of the third arm, and hence the supporting body which is supported on the free end section of the second arm is raised and lowered, thereby being introduced into the processing liquid in a processing liquid tank and being removed from same, along a movement path that follows a substantially vertical direction. Consequently, it is possible to raise or lower the supporting body in a substantially vertical direction, by means of a swinging link mechanism having a simple composition, and accordingly, equipment costs and maintenance costs can be reduced, and the position of the conveyed object can be controlled readily. Furthermore, since the conveyed object can be introduced into and removed from the processing liquid in a substantially vertical direction, then the processing liquid tank can be designed in a more compact fashion, in comparison with prior art examples in which the conveyed object is raised and lowered, and hence introduced into the processing liquid and removed from same, following an arc-shaped direction.

The invention according to another embodiment is a conveyance apparatus for a processing step comprising: a processing line wherein a processing liquid tank is disposed at a prescribed position; a movable body capable of moving along the processing line; a travel drive device for driving the movable body along the processing line; a swinging link mechanism which is provided on the movable body swingably in the upward and downward directions about a support axle and is capable of lowering and raising, following a substantially vertical direction, a supporting body supported on a free end section; and a first drive device for operating the swinging link mechanism and causing a conveyance object supported on the supporting body to be processed by being introduced into and removed from a processing liquid in the processing liquid tanks.

According to the invention described in the preceding paragraph, a supporting body supported on the free end section of a swinging link mechanism can be raised or lowered by the swinging link mechanism along a movement path following a substantially vertical direction, and hence it can be introduced into and removed from the processing liquid in the processing liquid tank, and furthermore, equipment costs and maintenance costs can be reduced by adopting a swinging link mechanism having a simple composition and the position of the conveyed object can be controlled readily.

BRIEF DESCRIPTION OF THE DRAWINGS

FIG. 1 is a schematic general plan view showing an embodiment of a coating line apparatus relating to the present invention;

FIG. 13 is a rear side cross-sectional view describing the first drive device and the first passive device;

DESCRIPTION OF THE PREFERRED EMBODIMENTS

An embodiment of a coating line apparatus (conveyance apparatus for a processing step) having a raising and lowering device for a vehicle body (article) relating to the present invention is described with reference to the drawings.

This coating line apparatus is used to carry out, for example, a degreasing process, a pre-treatment process such as chemical treatment, or the like, and undercoat painting, in an automobile plant. As shown in FIG. 1, the coating line (processing line) R is formed in an endless loop having the shape of an elongated circuit in plan view (or in side view), or it is formed in a square-shaped path. This square-shaped path is such that an outward path and a return path, which are linearly shaped, for instance, are connected by means of traversers, which are path-to-path movement devices. At prescribed positions in the coating line R, there are installed a plurality of processing liquid tanks (processing liquid tanks) D, such as hot wash, degrease, cold wash, film formation, cold wash, and the like, and an entry and exit section 1, processing liquids (for example, an electrolytic processing liquid, washing liquid, or the like) being accommodated inside the processing liquid tanks D, and electrodes for coating being disposed selectively on the under side and the left and right-hand sides of the processing liquid tank for coating, whereby electrodeposition coating can be carried out.

Figure 2:
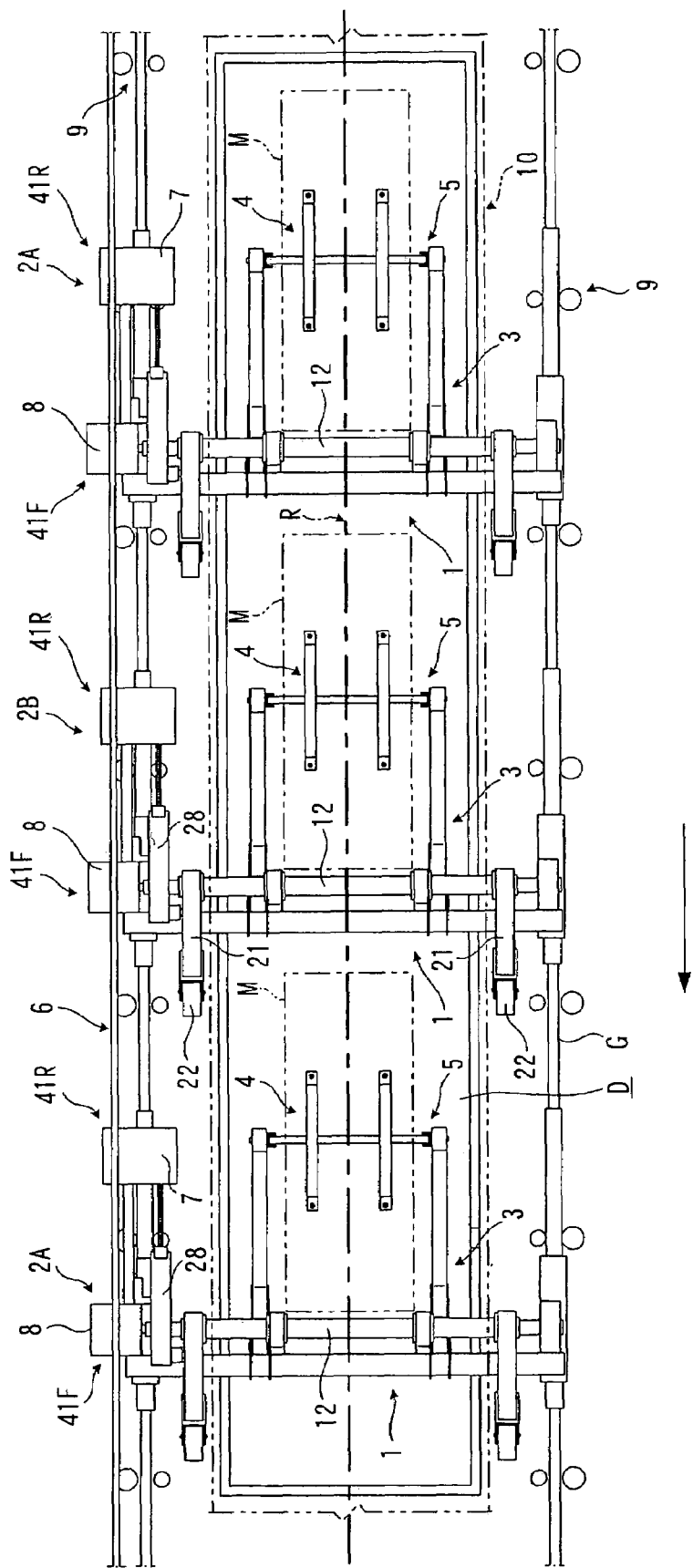
FIG. 2 is a plan view showing a processing liquid tank region of the coating line apparatus.
Figure 3:
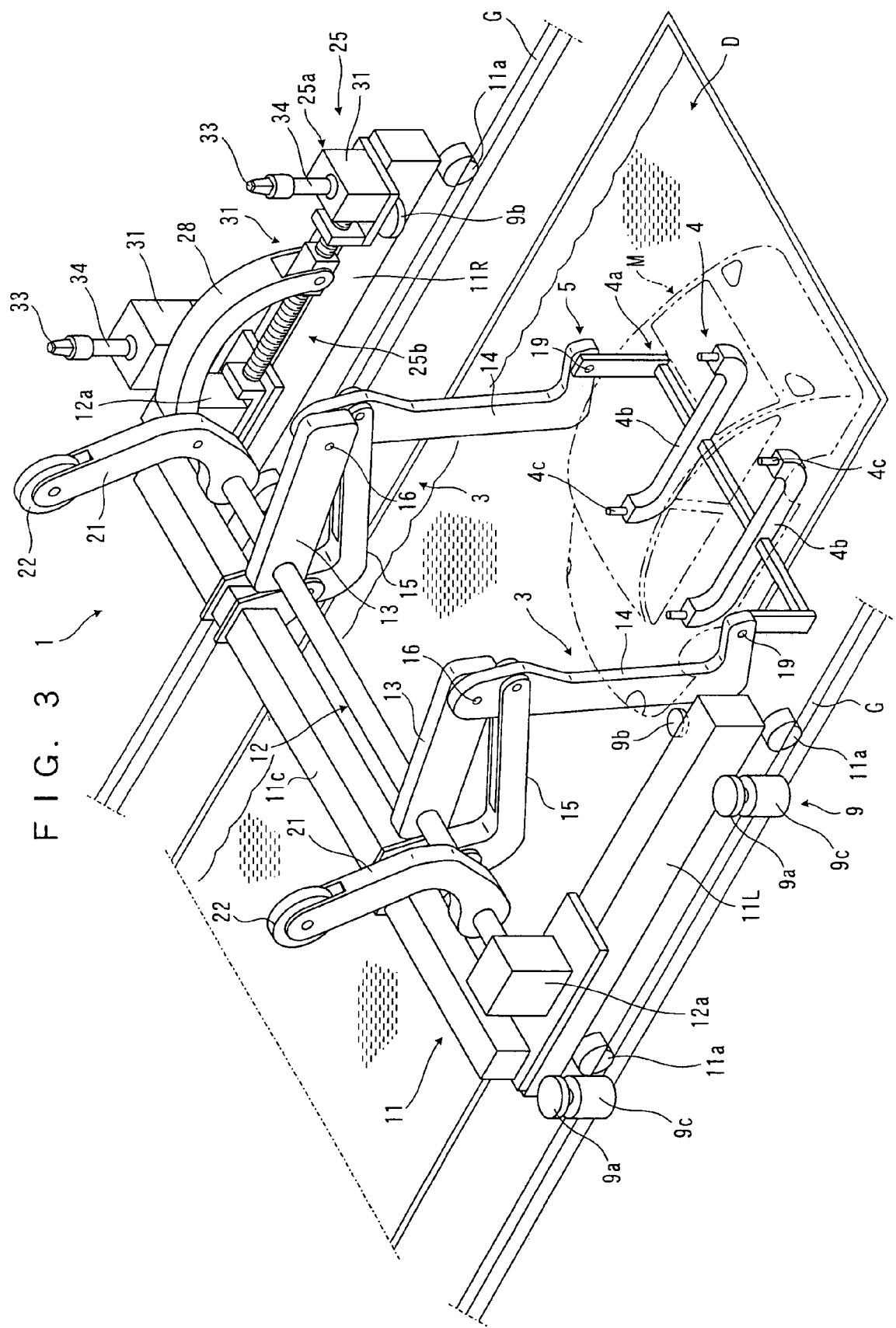
FIG. 3 is a perspective view showing a conveyance truck in the coating line apparatus.

As shown in FIG. 2 and FIG. 3, a pair of travel rails G are laid on the floor, following a coating line R, in a lateral direction which passes either side of the processing liquid tank D. A plurality of conveyance trucks (movable bodies) 1 each respectively supporting a vehicle body M, which is the conveyed object, are guided by the travel rails G and are disposed in a movable fashion thereon.

Figure 6:
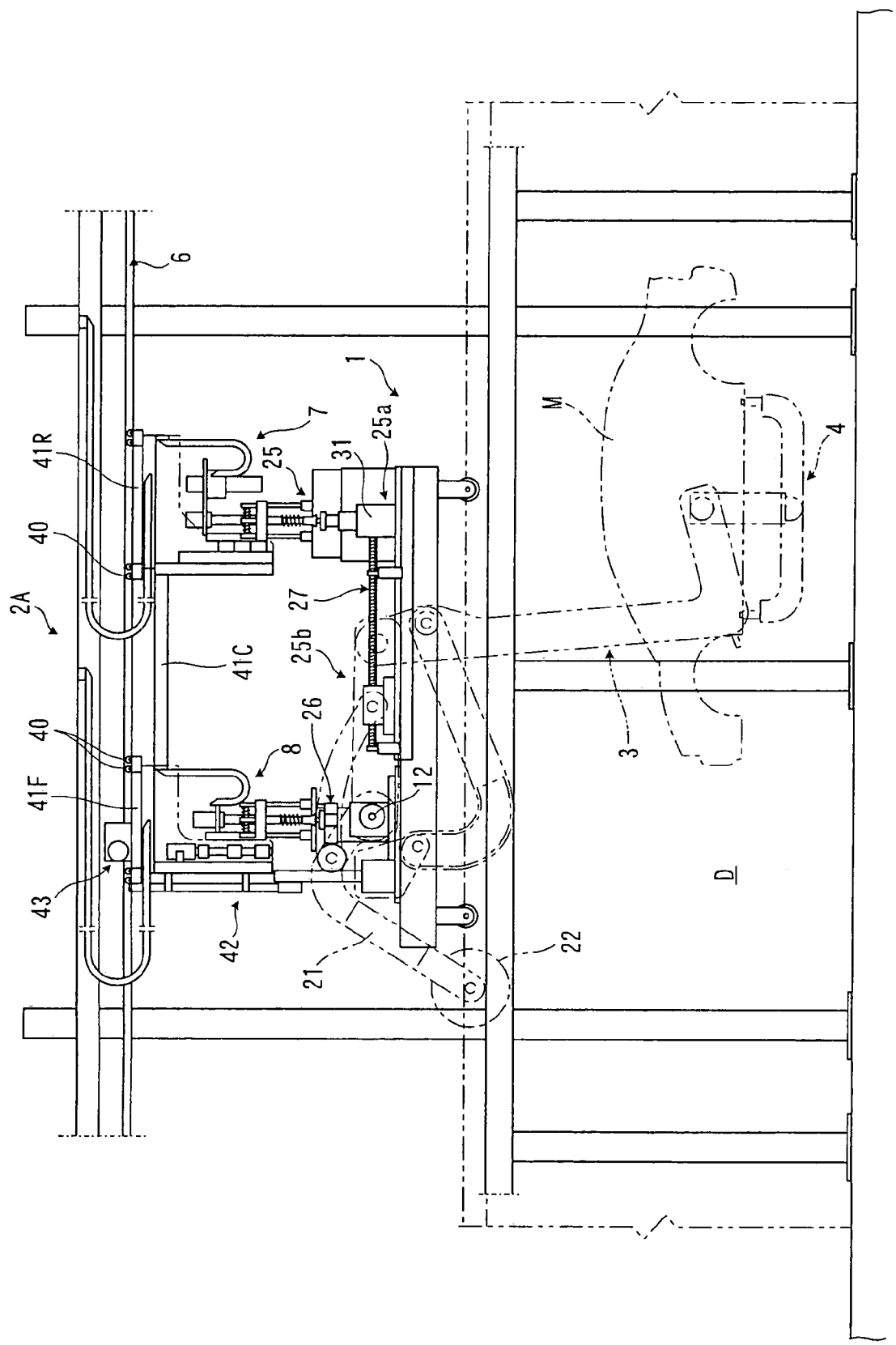
FIG. 6 is a side view showing an accompanying truck in a coating line apparatus.
Figure 7:
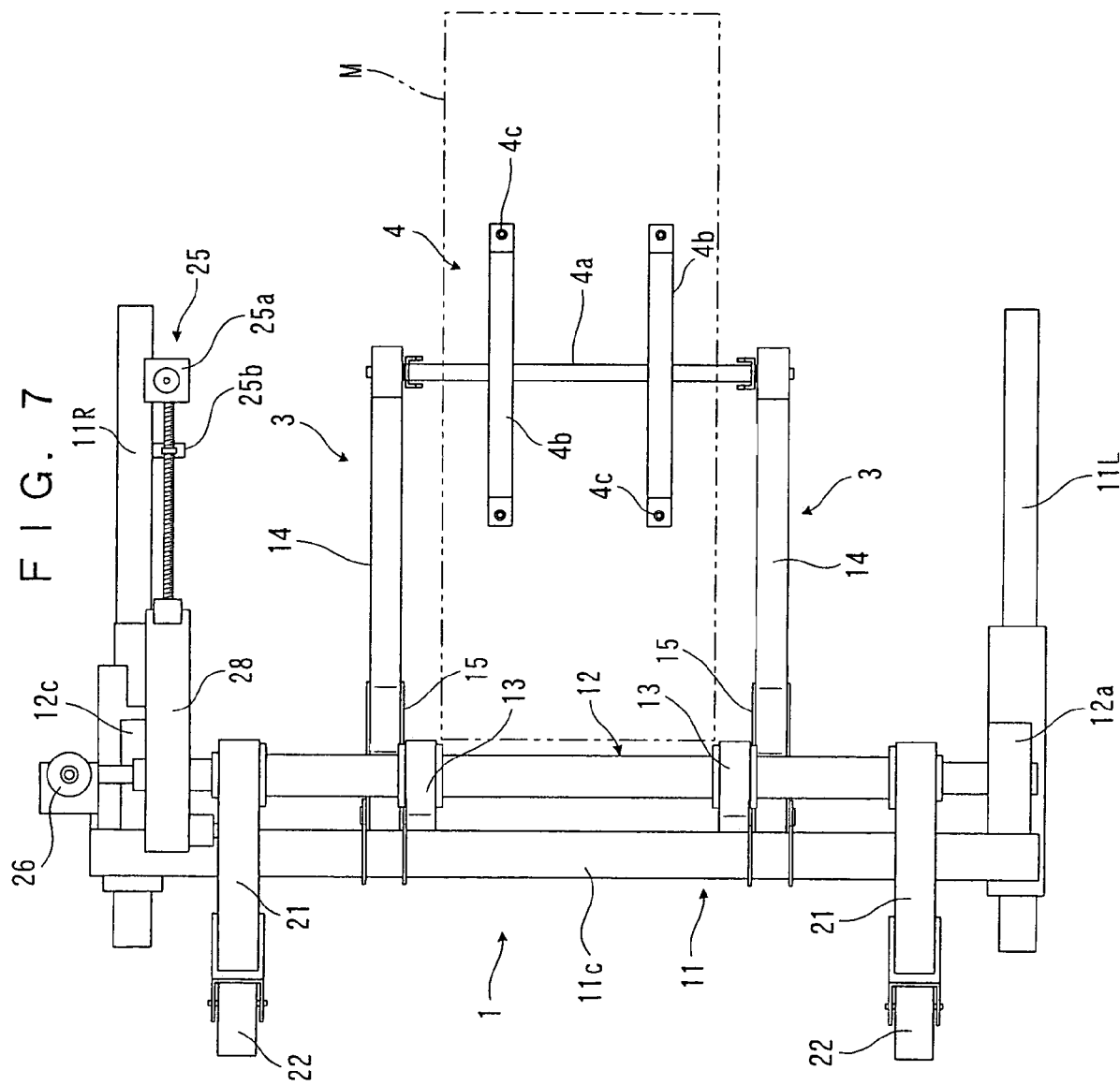
FIG. 7 is a plan view showing a conveyance truck.

Provided on the conveyance truck 1 are a swinging link mechanism 3 which supports the vehicle body M, via a supporting member (supporting body) 4, and which is capable of lowering the supporting member 4 and immersing same into the processing liquid tank D, and an angular position adjusting device 5 which is capable of adjusting the angular position of the vehicle body M, via the supporting member 4, by rotating about a horizontal axis which lies perpendicular to the direction of travel. Moreover, a ceiling rail 6 is disposed on one side of each of the processing liquid tanks D, following the direction of the coating line R. As shown in FIG. 6, one or a plurality of accompanying trucks (accompanying bodies) 2A, 2B capable of moving by being suspended from the ceiling rail 6 are provided with respect to the processing liquid tanks D.

Of these accompanying trucks 2A, 2B, the two accompanying trucks 2A which are disposed respectively at the entrance side and the exit side of the processing liquid tank D are mounted respectively with a first drive device 7 for operating the swinging link mechanism 3 and a second drive device 8 for operating the angular position adjusting device 5. This is in order that, when introducing the object into the processing liquid in the processing liquid tank D and when removing same from the processing liquid, the swinging link mechanism 3 is operated by the first drive device 7, the vehicle body M is raised or lowered, and furthermore, by means of the second drive device 8, the angular position of the vehicle body M is controlled to maintain the most suitable angular position with respect to the shape thereof, respectively, during introduction into and removal from the processing liquid. Furthermore, in an accompanying truck 2B disposed at an intermediate position of the processing liquid tank D, only the second drive device 8 for operating the angular position adjusting device 5 is provided. This is because, in order to carry out coating in a satisfactory manner, the angular position of the vehicle body M during immersion in the processing liquid must be adjusted, whereas it is not necessary to raise or lower the vehicle body M whilst it is immersed in the liquid. Naturally, if the processing liquid tank D is of short dimensions in the direction of travel, then it is possible to dispose one accompanying truck capable of traveling in the range between the entrance and the exit, a first drive device 7 and a second drive device 8 being mounted in this accompanying truck.

Here, the term "introduction" covers the process from the vehicle body M coming into contact with the surface of the processing liquid, and being lowered further, until it reaches a position in which it is immersed in the processing liquid. Moreover, the term "removal" covers the process from the vehicle body M being raised from an immersed state, traveling to the surface of the processing liquid, until it is removed from the surface of the processing liquid.

Figure 5:
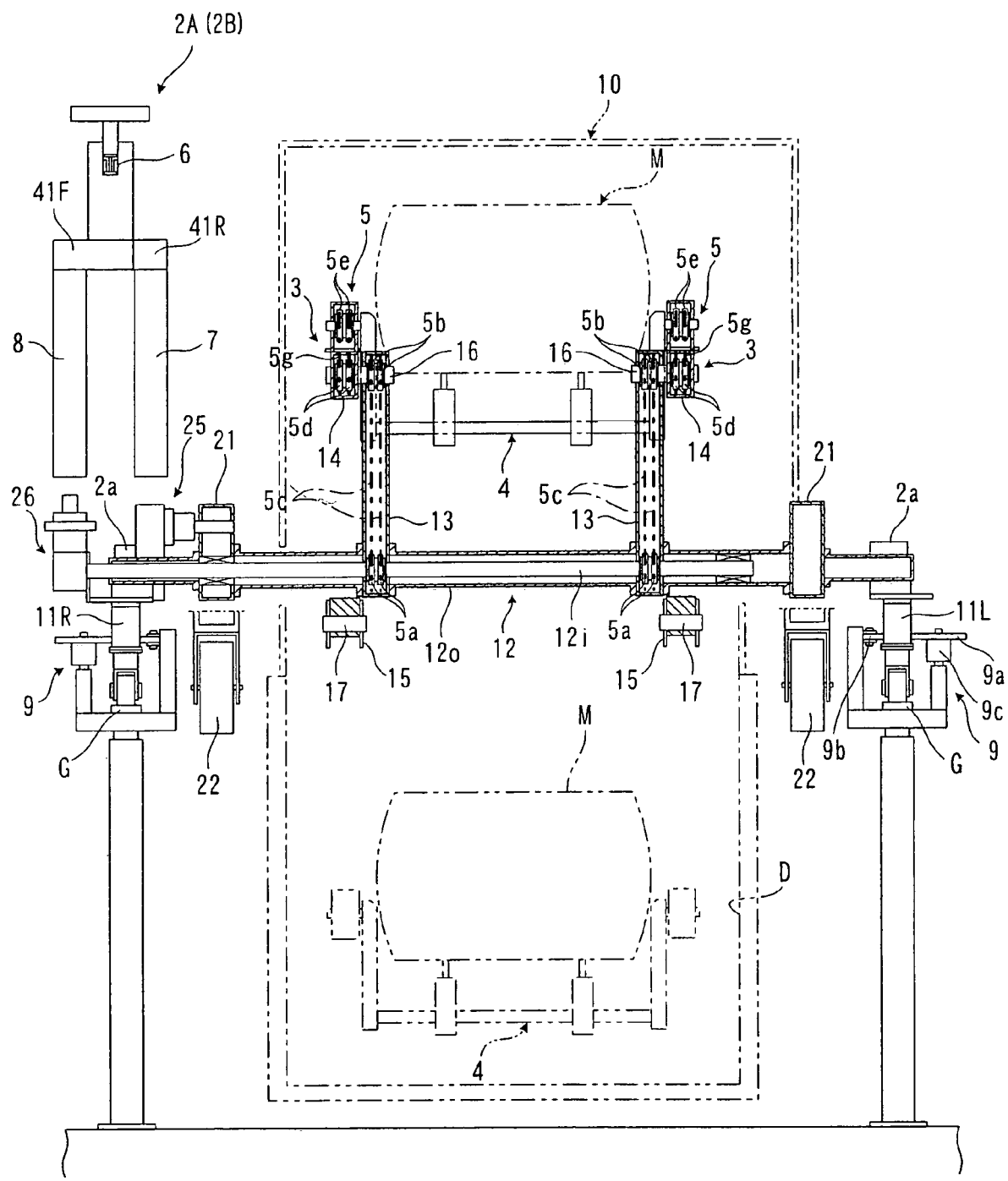
FIG. 5 is a front partial cross-sectional view showing a conveyance truck in the processing liquid tank section of the coating line apparatus.

As shown in FIG. 5, a cover 10 having a gateway-shaped cross-section, which covers the range of travel of the conveyance truck 1, is suspended above the processing liquid tank D, and it prevents dispersion of the processing liquid, such as the coating liquid, washing liquid, or the like. Furthermore, a truck travel device 9 which is described hereinafter, and the accompanying trucks 2A, 2B are disposed on the outer side of a dust protection cover 10, and hence there is virtually no infiltration of dust generated during travel, into the processing liquid tank D.

Description of One Embodiment of Conveyance Truck

As shown in FIG. 3–FIG. 8, the conveyance truck 1 comprises a square U-shaped truck frame 11, in plan view, which is open at the rear end in the direction of travel, and this truck frame 11 is formed by left and right-side travel beams (passive members) 11R, 11L and a connecting beam 11C which links the front ends of these travel beams 11R, 11L together. Furthermore, freely rolling travel wheels 11a, which are capable of moving by being guided respectively by the left and right-side travel rails G are provided respectively on the travel beams 11R, 11L. The truck travel device (travel drive device) 9 capable of causing the conveyance trucks 1 to advance, retreat or halt is a pressure roller type travel drive device (also called a "friction roller device"). The pressure roller type travel drive device is constituted by the travel beams 11R, 11L provided on the conveyance trucks 1, drive rollers (wheels) 9a and pressure wheels 9b, made of urethane, which grip the travel beams 11R, 11L from either side thereof and are disposed at a uniform pitch on either side of the travel rails G, and a travel drive motor 9c which is coupled to the drive wheels 9a. By means of the truck travel device 9, the speed of travel, and the halting, advance or retreat (direction of travel) of the individual conveyance trucks 1 at prescribed positions on the coating line R can be controlled readily, and furthermore, by using an insulating material, such as urethane rubber, or the like, for the wheels, it is possible readily to obtain an insulated structure, as required in electrolytic coating.

A rack and pinion type truck travel device may also be used instead of the pressure roller type truck travel device 9. This rack and pinion type truck travel device is constituted by travel racks (engaged members) installed on the travel beams 11R, 11L following the direction of travel, and drive pinions (wheels) which engage with the travel racks and are driven in rotation by travel motors disposed at a uniform pitch following the longitudinal direction of the travel rails G.

Bearing sections 12a are provided respectively on the front sections of the right-side travel beam 11R and the left-side travel beam 11L in the truck frame 11, and a support axle 12 running in the horizontal direction orthogonal to the direction of travel is supported in a rotatable fashion between the bearing sections 12a. This support axle 12 is constituted by a dual axle, comprising an inner axle 12i for adjusting the angular position, and an outer, tubular axle 12o for raising and lowering, which is fitted externally over the inner axle 12i, in a concentric fashion with same, and in a freely rotatable state.

A set of two swinging link mechanisms 3 are provided on the support axle 12, at a prescribed interval apart in the lateral direction. A supporting member 4 is supported between the free ends of the swinging link mechanisms 3. It is also possible to provide a set of three or more swinging link mechanisms 3 on the support axle 12, and to install supporting members 4 respectively between the free ends thereof.

The swinging link mechanisms 3 comprise a pair of first arms 13, the fixed end sections of which are fixed to the outer axle 12o of the support axle 12, second arms 14, respectively supported, rotatably about a first axle 16 parallel to the support axle 12, on the free end sections of these first arms 13, and third arms 15, the fixed end sections of which are supported, rotatably via second axles 17 oriented in the lateral direction, on brackets of the connecting beam 11C. The free end sections of the third arms 15 are respectively coupled via a third axle 18 to a position proximate to the fixed end section of the respective second arm 14, whereby they can control the rotation of the second arms 14. A supporting member 4 is suspended rotatably between the free end sections of the second arms 14, by means of fourth axles (free end axles) 19.

The supporting member 4 is constituted by a suspended arm 4a which is suspended from and supported rotatably on the free end sections of the second arms 14, via the fourth axles 19, a pair of holding beams 4b oriented in the front/rear direction and installed at a prescribed interval apart from each other on the lower edge member of the suspended arm 4a, and supporting sections 4c for holding a vehicle body M from below, installed on the front and rear ends of the respective holding beams 4b.

Figure 8:
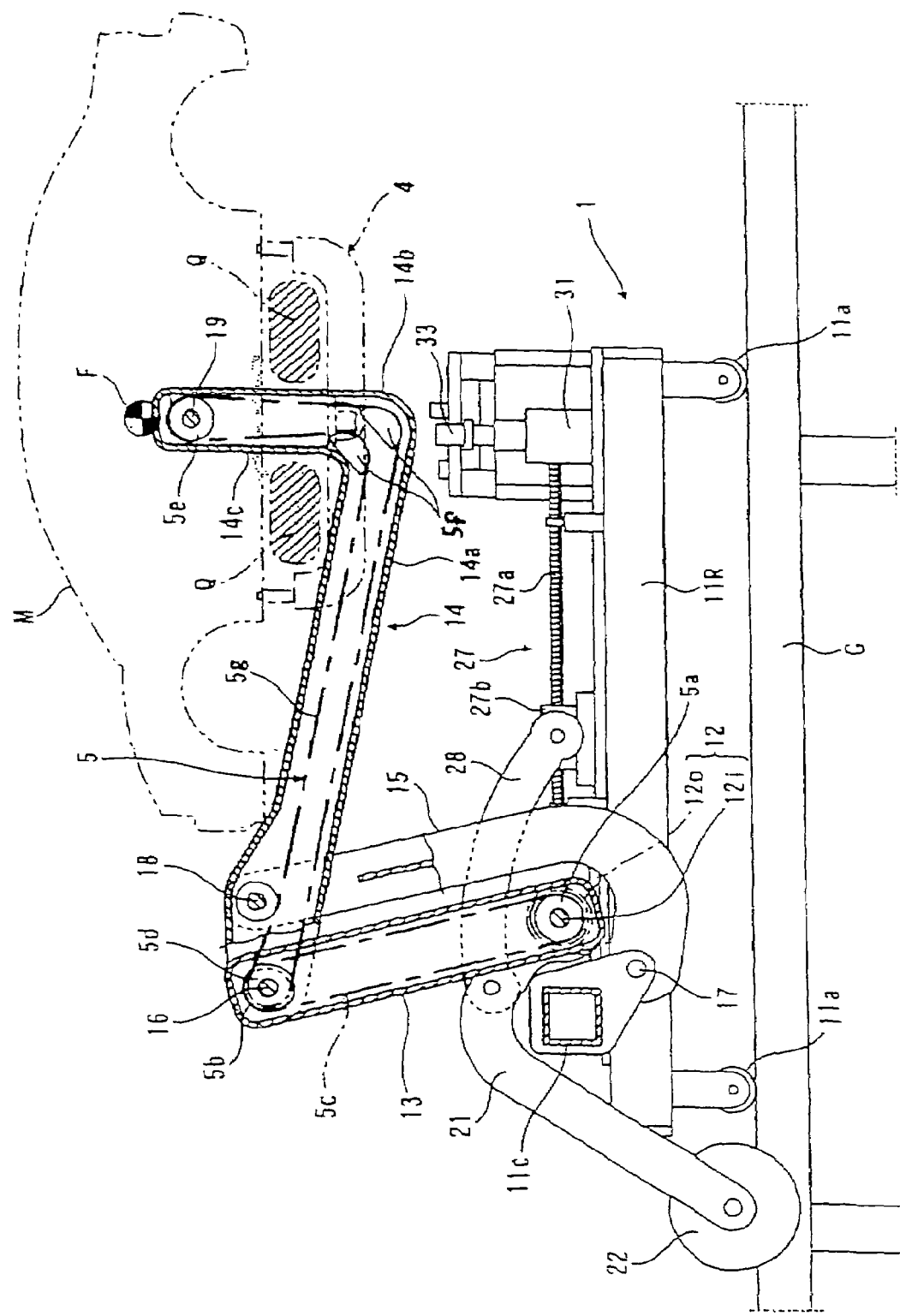
FIG. 8 is a side partial cross-sectional view showing the internal structure of the swinging link mechanism.

The first arms 13 are hollow, and as shown in FIG. 5 and FIG. 8, they are fixed to the outer axle 12o and project in a radial direction from same. A first constituent member of the angular position adjusting device 5 (a wound transmission mechanism) is installed internally in the first arm 13. The first constituent member is constituted by a first sprocket 5a which is fixed to the inner axle 12i, a second passive sprocket 5b which is fixed to the first axle 16, and a first chain 5c which is wound between the first sprocket 5a and the second passive sprocket 5b.

Furthermore, the second arms 14 are hollow, and are formed in an L shape in side view, each second arm 14 being constituted by a fixed end side linear section 14a extending in a substantially horizontal direction, a bend section 14b which is bent upwards at an angle of approximately 90° in the region of the free end section, and a free end side linear section extending from the bend section 14b to the free end positioned above same. By means of the shape of the second arms 14 and the holding beams 4b, open spaces Q are formed at the upper limit position of the arms as indicated in FIG. 8, when the vehicle body M is raised upwards, to the front side and the rear side of the center of gravity F of the vehicle body M in the direction of travel, these spaces Q being open to either side in the lateral direction. Therefore, by using an extending and retreating movement device having fork members, or the like, it is possible to introduce the fork members into the open spaces Q, from one side in the lateral direction, and to transfer the vehicle body M onto the supporting sections 4c. Moreover, the fourth axles 19 provided on the free sections of the second arms 14 are designed to reduce the momentum of the vehicle body M during angular position adjustment, thereby creating a smooth adjustment operation, due to the fact that they are disposed on a line of axis that passes in the vicinity of the position of the center of gravity F of the vehicle body M supported on the supporting sections 4c. Moreover, at the upper limit position of the arms as illustrated in FIG. 8, the second arms 14 adopt an angular position where the fixed end side linear sections 14a thereof are inclined upwards from the bend section 14b which assumes a lowermost position, and at the same time, the free end side linear sections 14c also adopt an inclined angular position above the bend section 14b which assumes a lowermost position, whereby the processing liquid which has adhered to the second arms 14 and the supporting body 4 during immersion is caused to flow down to the bend section 14b, from where it can drip into the processing liquid tank D and thus be removed. In this way, it is possible to prevent soiling of the conveyance trucks 1 caused by processing liquid.

Furthermore, a second constituent member (a wound transmission mechanism) of the angular position adjusting device 5 is also installed internally in the second arm 14. This second constituent member is constituted by a second drive sprocket 5d fixed to the first axle 16, a third sprocket 5e fixed to the fourth axle 19, an arc-shaped guide 5f provided in the bend section 14b, and a second chain 5g wound between the second drive sprocket 5d and the third sprocket 5e, via the arc-shaped guide 5f.

Consequently, the angular position adjusting device 5 transmits the rotation of the inner axle 12i, to the fourth axle 19, by means of the first sprocket 5a, the first chain 5c, the second passive sprocket 5b, the first axle 16, the second drive sprocket 5d and the third sprocket 5e, and hence by driving the inner axle 12i in rotation, it is possible to control the angular position of the vehicle body M, by causing the supporting member 4 to rotate about the fourth axles 19.

In order to prevent interference with the support axle 12, the third arms 15 are formed into a J-shape in side view, in such a manner that they are bent to form an arc-shaped bend section of approximately 120° on the fixed end side thereof.

Figure 4:
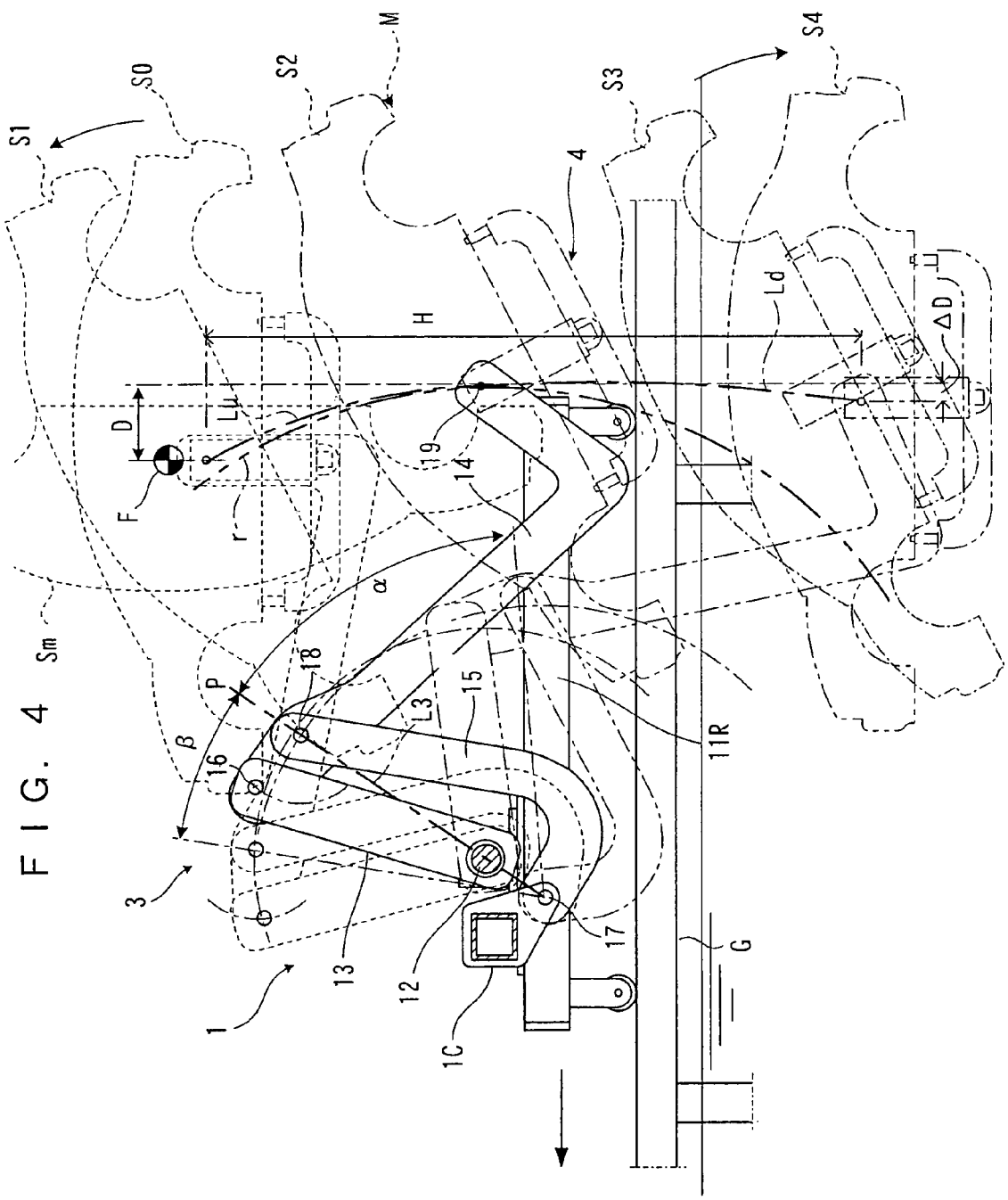
FIG. 4 is a side view for describing the operation of a swinging link mechanism of the conveyance truck.

As shown in FIG. 4, in the swinging link mechanisms 3, the second axles 17 at the fixed end sections of the third arms 15 are positioned below the support axle 12, and to the front of same in the direction of travel. Moreover, the line of axis L3 of the third arm, which links the fixed end section and the free end section of the third arm 15, is supported in a reciprocally rotatable manner in the upward and downward direction, such that it passes through the transition point P which passes through the support axle 12. Therefore, it is possible to obtain a large raising and lowering stroke (height H) in the movement paths Lu, Ld of the supporting member 4. Moreover, taking the transition point P as a reference, when the third arms 15 are rotated below or above the transition point P, they control the direction of rotation of the second arms 14.

More specifically, if the first arms 13 are rotated downwards (in the clockwise direction in FIG. 4), such that the axis line L3 of the third arms 15 moves beyond and below the transition point P and rotates into the range of α°, then the third arms 15 will cause the second arms 14 to rotate in the opposite direction to the first arms 13, about the first axles 16, (the anti-clockwise direction in FIG. 4). Accordingly, the lower path of travel Ld of the free ends (fourth axles 19) of the second arms 14 will be in a substantially vertical direction (having a distance of movement in the horizontal direction of AD). Moreover, if the first arms 13 are rotated upwards, and the axis line L3 of the third arms 15 is rotated beyond and above the transition point P (in an anti-clockwise direction), into the range of β°, then the third arms 15 will cause the second arms 14 to rotate in the same direction (clockwise direction) as the first arms 13, and hence the distance of horizontal travel in the upper movement path Lu of the free ends (fourth axles 19) of the second arms 14 is kept within a short range in comparison to the distance of horizontal travel of an arc-shaped path of travel r centered about the support axle 12.

Thereby, in the upper path of travel Lu, where the vehicle body M is above the processing liquid, the positional displacement of the vehicle body M in the direction of travel is small, during the raising or lowering operation by the swinging link mechanisms 3, and furthermore, in the lower path of travel Ld where the vehicle body M is in contact with and immersed in the processing liquid, the vehicle body M is raised and lowered in a substantially vertical direction, and hence the positional displacement of the vehicle body M in the direction of travel is extremely small. By this means, it is possible to determine the position of introduction of the vehicle body M into the liquid, and the angle of introduction thereof, readily, as well as controlling the angular position of same with good accuracy, without having to make complicated positional corrections.

A pair of passive levers (lever members) 21 are fixed onto the outer axle 12o of the support axle 12, respectively, to the outer sides of the first arms 13. Balancing weights (counterbalances) 22 are attached to the free ends of these passive levers 21, and the levers are bent in a peak shape in the intermediate portion thereof and are fashioned so as to project in the forward direction of travel. The balance weights 22 are disposed respectively in a distributed fashion to the left and right-hand sides of the supporting member 4, and furthermore, as shown in FIG. 2, they are positioned on either side of the vehicle body M on the moving truck 1 which travels adjacently in front of same, and therefore it is possible to prevent the balance weights 22 from interfering with the vehicle body M on the moving truck 1 which travel adjacently to same. Consequently, it is possible to reduce the pitch of travel of the conveyance trucks 1 traveling adjacently in the front and rear direction, and furthermore, even in the case of a processing liquid tank D which allows a plurality of vehicle bodies M to be immersed in the processing liquid tank D simultaneously, the length thereof in the direction of travel can be reduced, and hence the tank can be formed to more compact dimensions.

As shown in FIG. 6, the accompanying trucks 2A, 2B are guided and supported in a movable fashion by a ceiling rail 6, and they comprise a front accompanying frame 41F and a rear accompanying frame 41R which are mutually coupled by means of a coupling rod 41C. Idle type travel guide rollers 40, a vibration preventing roller, and a jump preventing roller, and the like, which roll over the travel surface and the guide surfaces of the ceiling rail 6 are provided in the front accompanying frame 41F and the rear accompanying frame 41R, whereby the respective frames are suspended in a movable fashion. Moreover, a drive wheel for rolling over the travel surface of the ceiling rail 6, and a returning movement device 43, which is constituted by a returning motor for driving the drive wheel, and is capable of returning the accompanying trucks 2A, 2B to their point of origin, are also provided. Furthermore, a docking device (travel coupling device) 42 capable of following forward movement in synchronism with the conveyance truck 1, and a second drive device 8 for operating the angular position adjusting device 5, are provided on the front accompanying frame 41F. Moreover, a first drive device 7 for operating the swing link mechanisms 3 is provided on the rear accompanying frame 41R.

Figure 9:
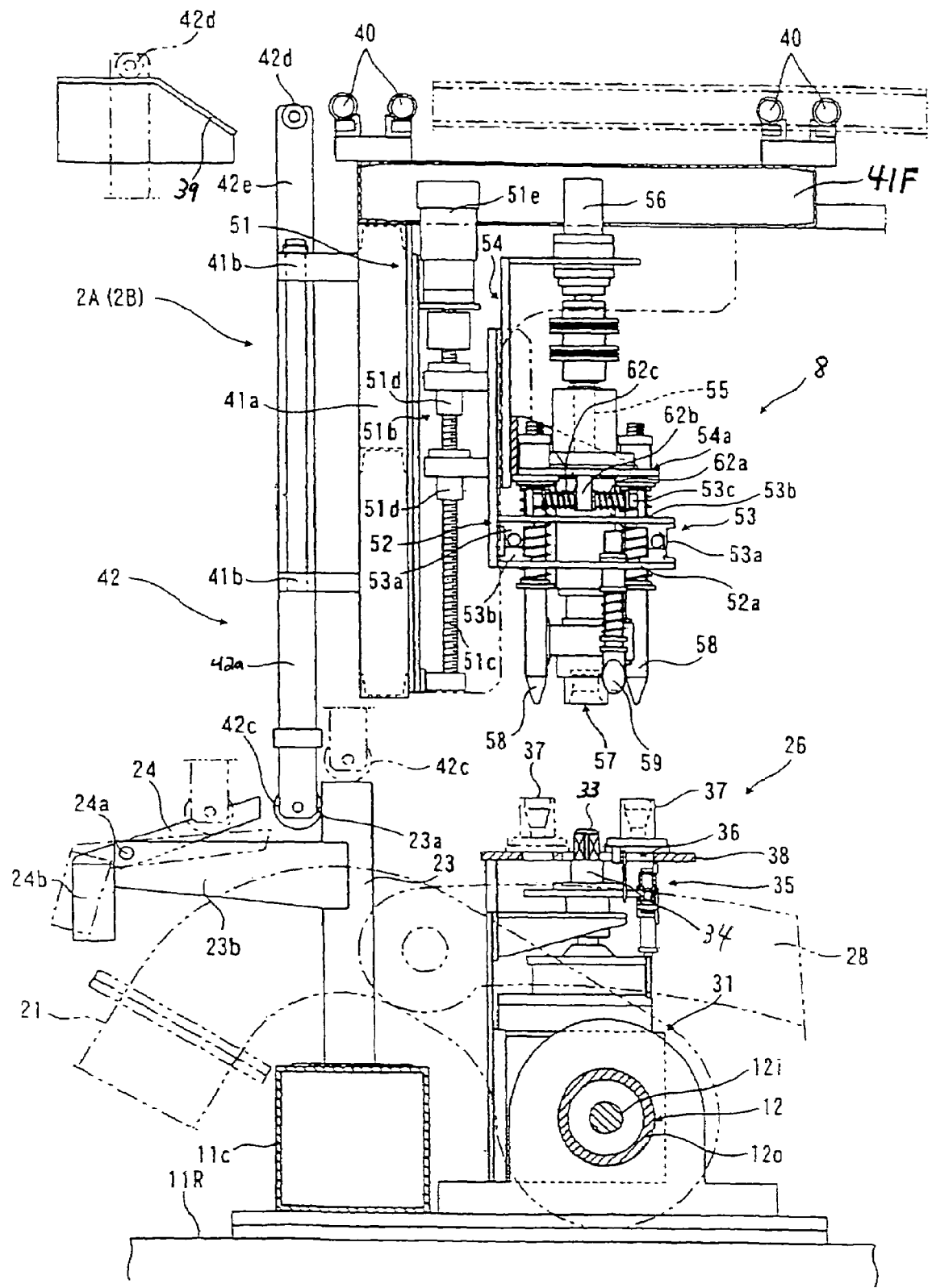
FIG. 9 is a side partial cross-sectional view showing a second drive device and docking device of the accompanying truck and the second device of the conveyance truck.
Figure 10:
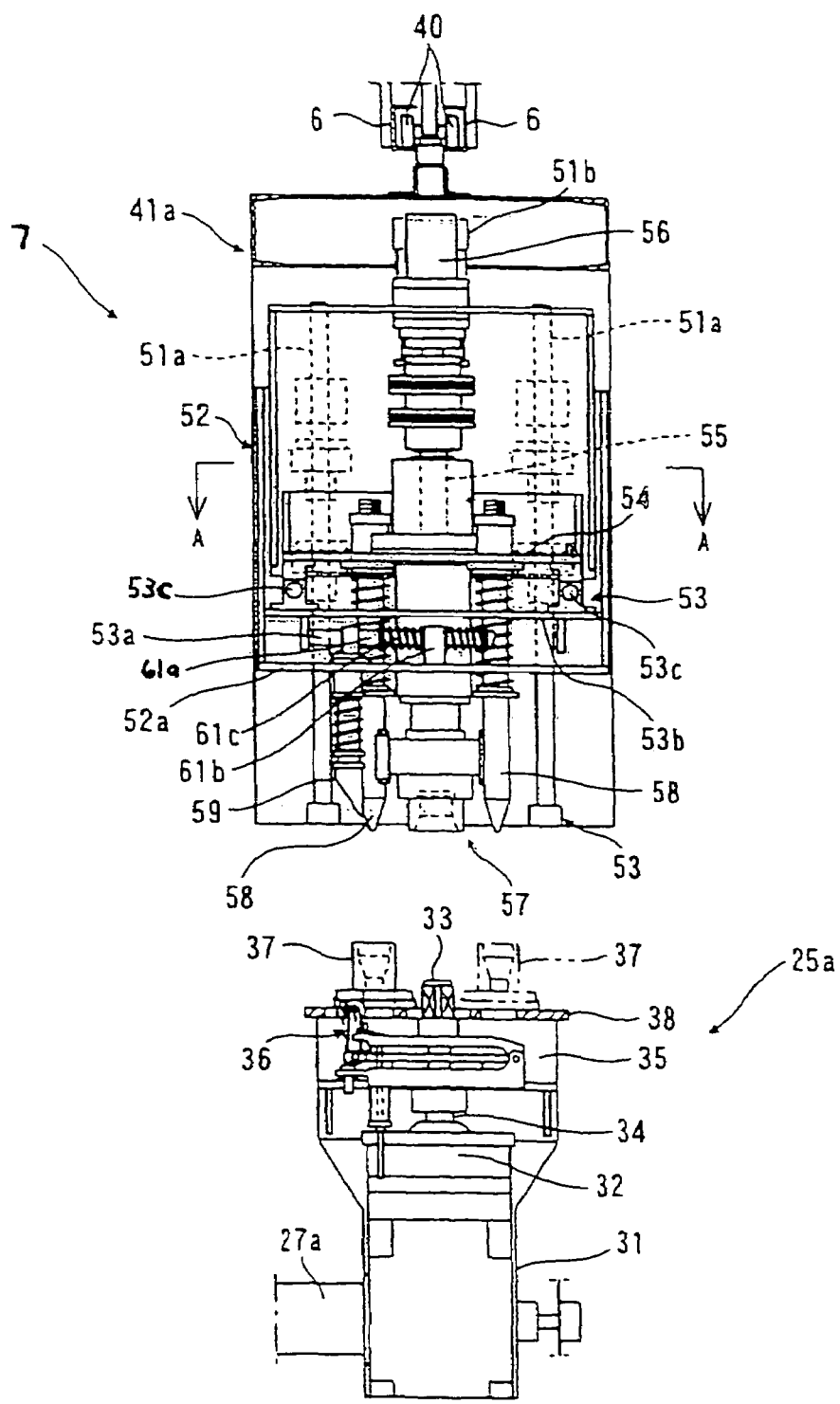
FIG. 10 is a rear view showing a first drive device of the accompanying truck and a first passive device of the conveyance truck.
Figure 11:
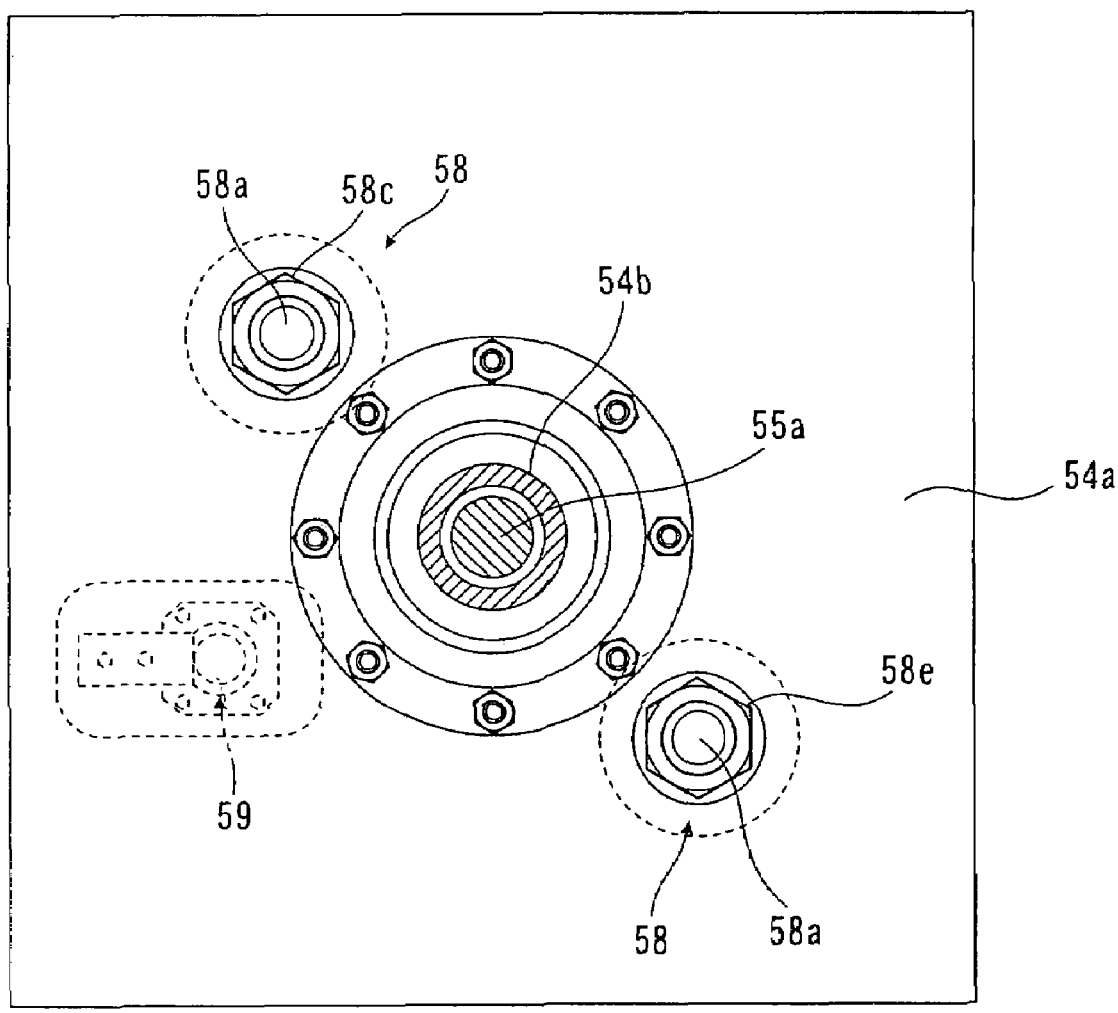
FIG. 11 is a cross-sectional view along A—A in FIG. 10.

As shown in FIG. 9, an operating rod 42a of the docking device 42 is supported raisably and lowerably within a prescribed range, via a guide member 41b, on the front portion of a vertical frame 41a which is suspended from the front section of the front accompanying frame 41F, and the operating rod 42a is impelled downwards by an extending and contracting member having a built-in coil spring, (or by means of its own weight). A release roller 42d is installed on the upper end of the operating rod 42a, in a rotatable fashion about a horizontal axis which is perpendicular to the direction of travel, and a pressure receiving roller 42c is installed on the lower end of the operating rod 42a, in a rotatable fashion about a horizontal axis which is perpendicular to the direction of travel. On the other hand, a pushing support bar 23 formed with an abutting section 23a against which the pressure receiving roller 42c can abut, is installed in a standing fashion on the front portion of the conveyance truck 1. A restricting lever 24 is supported in a rotatable fashion within a prescribed range in the upward and downward direction, on the front portion of a projecting member 23b projecting forwards from the pushing support bar 23, by means of a horizontal pin 24a which is perpendicular to the direction of travel. This restricting lever 24 has a weight 24b installed on the front end section thereof, whereby it is impelled in a rotational direction such that it assumes an inclined angular position where the rear end section thereof is raised upwards, and upward rotation thereof from this inclined angular position with the rear end in an upper position is restricted by means of a stopper. Accordingly, the restricting lever 24 is swingable between an inclined angular position (as indicated by the solid lines), and a lying angular position (as indicated by the dotted lines) wherein the pressure receiving roller 42c abuts against the upper face of the lever 24 and presses same downwards. Moreover, when the restricting lever 24 is in the inclined angular position, the rear end portion thereof is separated by a prescribed distance from the abutting section 23a, to the front side thereof. Furthermore, at a prescribed position of the ceiling rail 6, a returning cam member 39 is provided which causes the release roller 42d to be lifted upwards, thereby causing the operating rod 42a to be pulled upwards, and this returning cam member 39 releases the docking of the accompanying truck 2A, 2B with the conveyance truck 1, and limits the movement of the accompanying truck 2A, 2B.

Therefore, when a conveyance truck 1 approaches an accompanying truck 2A, 2B that is halted at an original position, firstly, the upper face of the restricting lever 24 in the inclined angular position abuts against the pressure receiving roller 42c of the operating rod 42a, whereby the restricting lever 24 is pushed downwards as the conveyance truck 1 advances. Thereupon, the pressure receiving roller 42c is released from the upper face of the restricting lever 24, and the restricting lever 23 returns to its inclined angular position, due to the weight 24b. The pressure receiving roller 42c abuts against the abutting section 23a of the pushing support bar 23. Thereby, the travel drive force of the conveyance truck 1 is transmitted from the pushing support bar 23, via the operating rod 42a, to the accompanying truck 2A, 2B, and hence the accompanying truck 2A, 2B is caused to travel in synchronism with the conveyance truck 1. Furthermore, if the conveyance truck 1 is halted, then the pressure receiving roller 42c abuts against the rear end section of the restricting lever 24, thereby restricting the forward movement of the accompanying truck 2A, 2B, and hence the accompanying truck 2A, 2B does not move under its own inertia.

If the conveyance truck 1 approaches the movement limit position of the accompanying truck 2A, 2B, then the release roller 42d rides up onto the returning cam 39, and hence the operating rod 42a is pulled upwards, the pressure receiving roller 42c moves beyond the upper end of the pushing support bar 23 and is released, and the conveyance truck 1 continues to travel forwards whilst leaving the accompanying truck 2A, 2B behind.

As shown in FIG. 9 to FIG. 12, the second drive device 8 is provided with a withdrawing frame 52 supported raisably and lowerably via a raising and lowering projecting and retreating device 51, said device being movable back and forth, a supporting frame 54 supported on the withdrawing frame 52 by means of a positioning mechanism 53, an extension drive axle 55 supported and suspended in a rotatable fashion on the supporting frame 54, a first rotational drive device 56 coupled to the upper end section of the extension drive axle 55, an engaging body (spindle) 57 installed on the lower end section of the extension drive axle 55, and a pair of positioning rods 58 and a brake release rod 59 suspended from the supporting frame 54. Since the first drive device 7 and the second drive device 8 have the same structure, the first drive device 7 is described, and elements of the second drive device 8 are labeled with the same reference numerals.

The raising and lowering projecting and retreating device 51 is constituted by a pair of withdrawing rails 51a installed on the rear face of the vertical frame 41a of the front accompanying frame 41F, a withdrawing frame 52 disposed raisably and lowerably on the withdrawing rails 51a, via a slide member, and a screw shaft type withdrawal driving device 51b, provided on the vertical frame 41a, for driving the raising and lowering of the withdrawing frame 52. In the withdrawal driving device 51b, a upward/downward withdrawal screw shaft 51c is supported rotatably on a bearing provided on the vertical frame 41a, female screw members 51d coupled to the withdrawing frame 52 are screwed onto the withdrawing screw shaft 51c, and a withdrawing motor 51e for driving the screw shaft 51c in a rotary fashion is provided. Consequently, if the screw shaft 51c is caused to rotate by the withdrawing motor 51e, then the withdrawing frame 52 is moved upwards or downwards by means of the female screw members 51d.

In the positioning mechanism 53, an intermediate memory 53b is supported elastically on top of a base plate 52a provided on the withdrawing frame 52, in a reference position in the lateral direction, by means of lateral direction elastic supporting mechanisms 53a provided as a set of two in the direction of travel, and furthermore, the supporting frame 54 is supported elastically on top of the intermediate member 53b, in a reference position in the direction of travel, by means of direction of travel elastic supporting mechanisms 53c provided as a set of two in the lateral direction. In the lateral direction elastic supporting mechanisms 53a, a slide member 61b coupled to the intermediate member 53b is fitted externally in a slidable fashion over a left/right-oriented guide rod 61a disposed on top of the base plate 52a, and the intermediate member 53b is supported elastically in a reference position, via the slide member 61b, by means of pushing springs 61c that are fitted externally over the guide rod 61a, on either side of the slide member 61b. Moreover, in the direction of travel elastic supporting mechanism 53c, a slide member 62b coupled to the supporting frame 54 is fitted externally in a slidable fashion over a left/right-oriented guide rod 62a disposed on top of the intermediate member 53b, and the supporting frame 54 is supported elastically in a reference position, via the slide member 62b, by means of pushing springs 62c that are fitted externally over the guide rod 62a, on either side of the slide member 62b. By means of the lateral direction elastic supporting mechanism 53a and the direction of travel elastic supporting mechanism 53c, then even if the engaging body 57 is displaced in position with respect to the engaging pin 33, it is possible to displace the position of the supporting frame 54 in the direction of travel and in the lateral direction, and hence aligning can be carried out easily.

Figure 12:
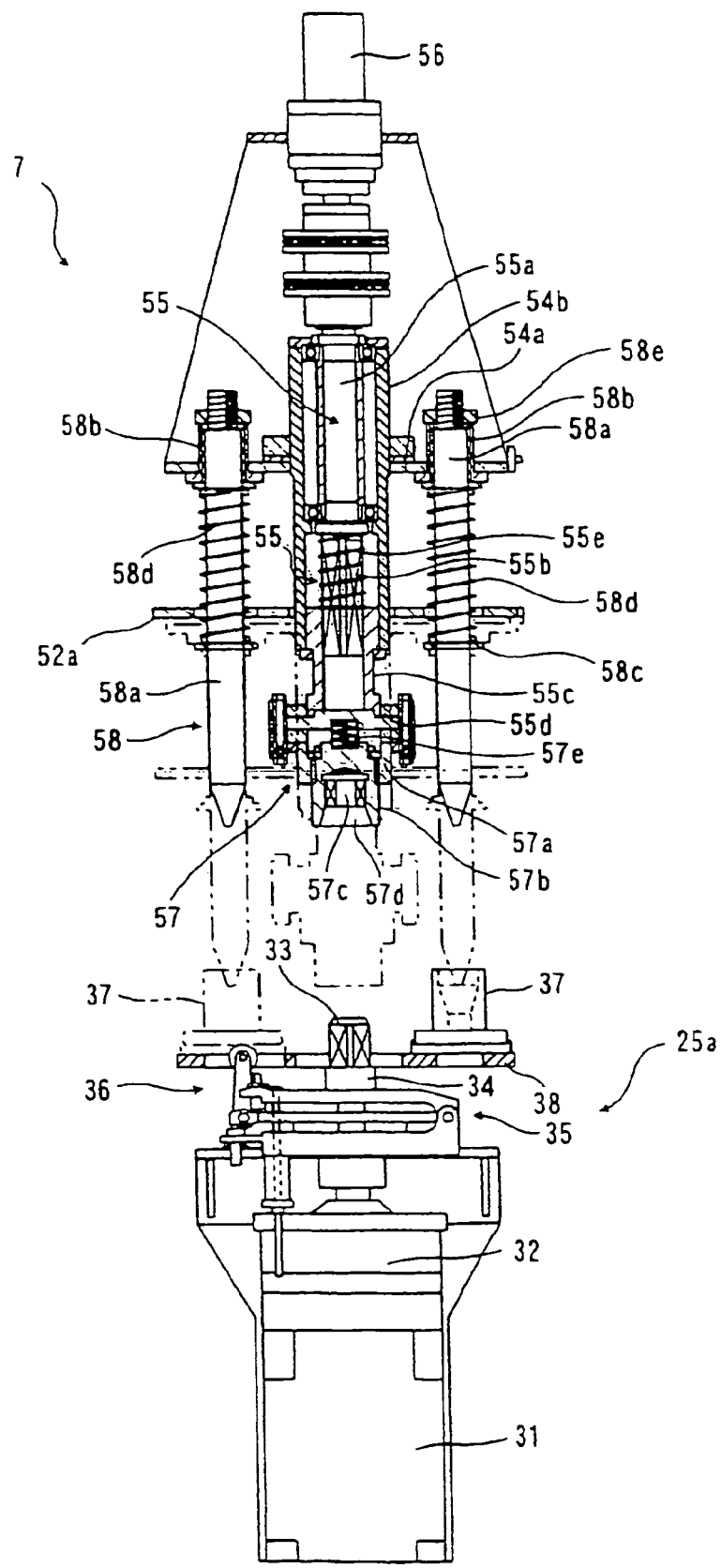
FIG. 12 is a rear side cross-sectional view showing the first drive device and the first passive device.

A supporting tube 54b for supporting the extension drive axle 55 in a rotatable fashion is provided on the supporting plate 54a of the supporting frame 54. As shown in FIG. 12, the extension drive axle 55 comprises a rotating axle section 55a, the upper end section of which is coupled via a flange to the output shaft of the rotational drive device 56, and the lower portion of which is supported rotatably on the supporting tube 54b, by means of an axial bearing, an angular axle section 55b having a rectangular cross-section formed on the lower portion of this rotating axle section 55a, and a slide axle tube 55c fitted externally on the angular axle section 55b in such a manner that it is able to slide in the axial direction thereof only, and having an engaging body 57 installed on the lower end portion thereof, via an insulating flange section 55*d*. The slide axle tube 55*c* is impelled downwards by a coil spring 55*e* fitted externally onto the angular axle section 55*b*.

In the engaging body 57, a nut body 57*b* is held on a holding body 57*a* coupled to an insulated flange section 55*d*, and a coupling hole is formed in the lower face of the nut body 57*b*. This coupling hole 57*c* is formed with a substantially rectangular cross-section, and a guide taper section 57*d* which expands in the downward direction is formed in the lower portion of this coupling hole 57*c*, in such a manner that the engaging body 57 can be engaged readily with the engaging pin 33. Furthermore, the nut body 57*b* is held swingably within a prescribed range in a holding hole of the holding body 57*a*, and it is maintained elastically in a reference angular position whereby it is open in the downward direction, by means of a pressurizing spring 57*e* that impels the nut body 57*b* downwardly.

Each of the positioning rods 58 has a rod main body 58*a* comprising a round bar member, the lower end of which is formed in a pointed shape, the rod main body 58*a* being supported in a raisable and lowerable fashion within a prescribed range, by a pair of guide sleeves 58*b* fixed to the supporting frame 54 and passing through the supporting plate 54*a*. Furthermore, a compression coil spring 58*d* is fitted externally between a restricting ring 58*c* fixed at an intermediate position of the rod main body 58*a* and the guide sleeves 58*b* in the positioning rods 58, the rod main body 58*a* being impelled downwards by means of this compression coil spring 58*d*, and the downward movement of the rod main body 58*a* being restricted by a restricting nut 58*e* attached to the upper end portion of the rod main body 58*a*.

Figure 14:
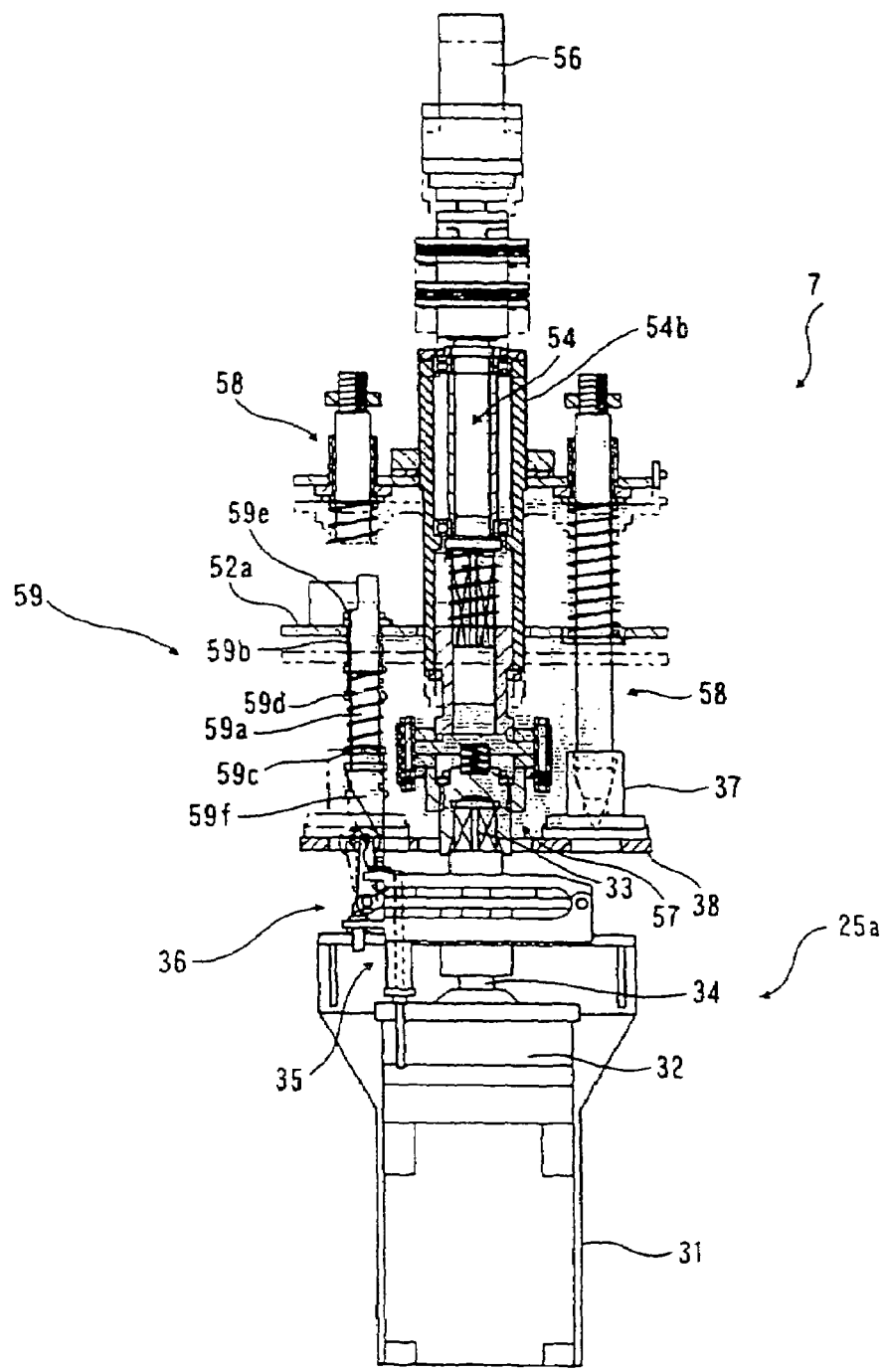
FIG. 14 is a rear side partial cutaway cross-sectional view for describing the operation of the first drive device and the first passive device.
Figure 15A:
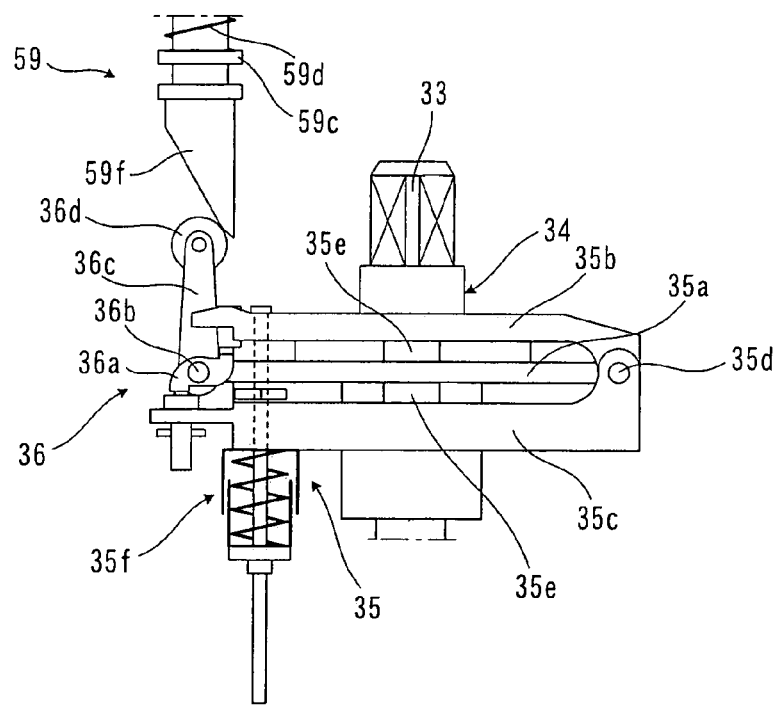
FIG. 15A is an operation diagram for describing the operation of the brake device of the first and second passive devices, and the brake release mechanism.
Figure 15B:
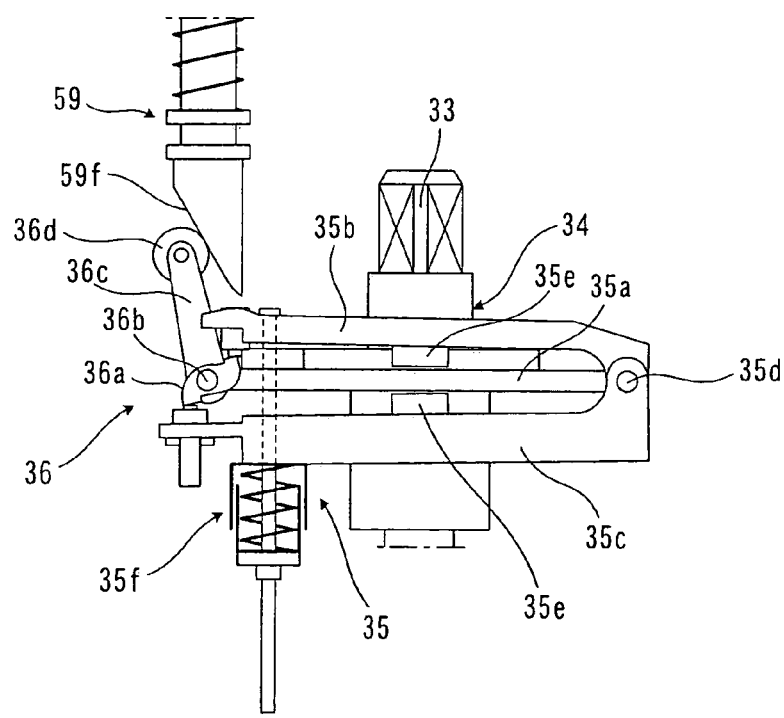
FIG. 15B is an operation diagram for describing the operation of the brake device of the first and second passive device and the brake release mechanism.
Figure 16A:
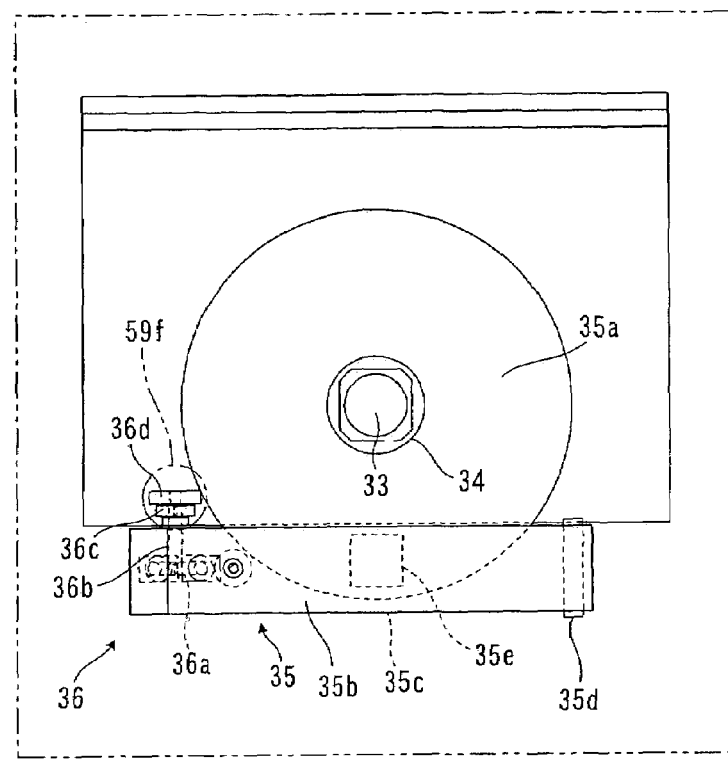
FIG. 16A is a general plan view showing first and second passive devices.
Figure 16B:
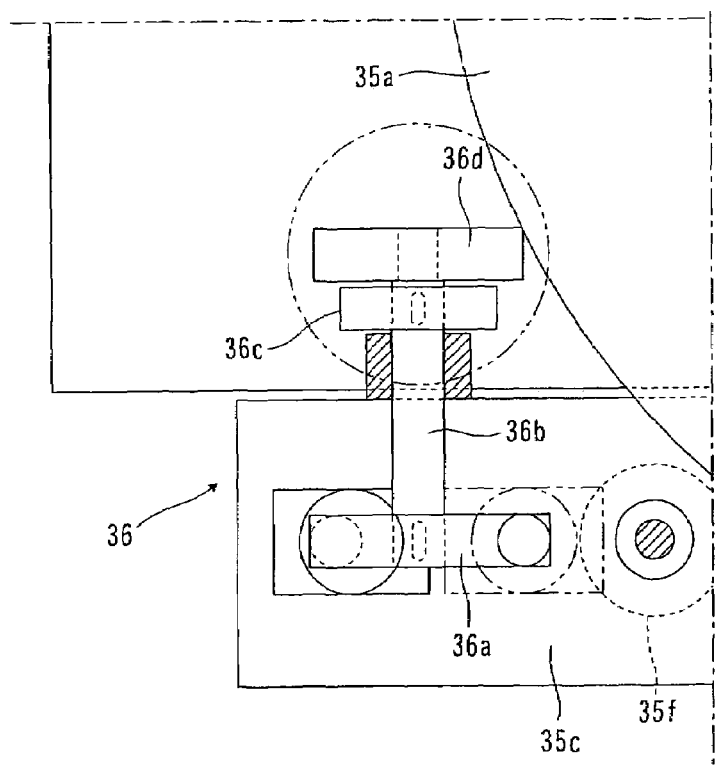
FIG. 16B is a partial plan view showing the brake release mechanism of the first and second passive device.

As shown in FIG. 14, the brake release rod 59 comprises an inclined pressuring face 59*f* formed on the lower end of a round bar shaped rod main body 59*a*. A pair of guide sleeves 59*b* are passed through and fixed to the base plate 52*a* of the withdrawing frame 52, and the rod main body 59*a* is inserted into the guide sleeves 59*b* and is supported in a raisable and lowerable fashion within a prescribed range. Furthermore, a compression coil spring 59*d* is fitted externally over the rod main body 59*a*, between a restricting ring 59*c* fixed to an intermediate position of same and the guide sleeves 59*b*, and the rod main body 59*a* is impelled downwardly by means of this compression coil spring 59*d*. The downward movement of the rod main body 59*a* is restricted by a restricting nut 59*e* installed on the upper end portion of the rod main body 59*a*.

Description of Second Embodiment of Conveyance Truck

On the other hand, a right-side travel beam 11R of the conveyance truck 1 is positioned below the accompanying trucks 2A, 2B which move in synchronism with a conveyance truck 1. A first passive device 25 for receiving the drive force of the first drive device 7 and a second passive device 26 for receiving the drive force of the second drive device 8 are provided on this right-side travel beam 11R. The first passive device 25 causes the outer axle 12*o* of the support axle 12 to rotate, by means of a right-side passive lever 21. The second passive device 26 drives the inner axle 12*i* of the support axle 12 in rotation.

The first passive device 25 comprises a passive section 25*a* disposed in the rear portion of the right-side travel beam 11R, which is capable of coupling to and decoupling from the first drive device 7, and a lever type rotating section 25*b* which transmits drive force input to the passive section 25*a*, to the outer axle 12*o* of the support axle 12.

The passive section 25*a* is provided with an axle bearing box 32 provided on top of a gear box 31, a positioning socket 37 provided in a standing manner on a positioning plate 38 on top of the axle bearing box 32, with which the positioning rod 58 is able to engage, a passive axle 34 supported rotatably by the axle bearing box 32 and having an engaging axle section 33 of substantially rectangular cross-section formed on the upper end thereof, with which the engaging body 57 is able to engage and disengage, a brake device (first and second brake devices) 35 which fix the passive axle 34 in position, when the first drive device 7 is not coupled, and a brake release mechanism 36 for releasing the brake device 35 by means of the brake release rod 59 when the first drive device 7 is coupled.

A raising and lowering screw axle 27*a* (described hereinafter) of the lever type drive section 25*b* (the outer axle 12*o* of the support axle 12 in the first drive device 7) is coupled to the gear box 31. A brake release device is constituted by the brake release rod 59 and the brake release mechanism 36.

As shown in FIG. 8, the lever type rotating section 25*b* comprises a screw axle drive mechanism 27 which is coupled to and moves with the passive section 25*a* on the right-side travel beam 11R, and the rotating lever 28 which is coupled between the screw axle drive mechanism 27 and the passive lever 21. The rear end portion of the rotating lever 28 is coupled rotatably to the female screw member 27*b* of the screw axle drive mechanism 27, and the front end portion thereof is coupled rotatably to the base end side thereof. Moreover, the fixed end portion of the passive lever 21 is coupled to the outer tubular axle 12 of the support axle 12. In the screw axle drive mechanism 27, the raising and lowering screw axle 27*a* oriented in the direction of travel is supported rotatably about the axis thereof between a bearing member provided on the front portion of the right-side travel beam 11R and the gear box 31 to the rear side, and the rear end portion of the raising and lower screw axle 27*a* is coupled to and moves with the passive axle 34 of the passive section 25*a*, via a gear. Moreover, a female screw member 27*b* is screwed to the raising and lowering screw axle 27*a*, and the front end portion of the rotating lever 28 is coupled to the female screw member 27*b* by means of a horizontal pin extending in the lateral direction. Therefore, if the raising and lower screw axle 27*a* is rotated due to the motive force from the passive section 25*a*, then the female screw member 27*b* moves in the direction of travel, the rotating lever 28 is pushed, and hence the outer tubular axle 12*o* is caused to rotate by means of the passive lever 21.

As shown in FIG. 15A, FIG. 15B, FIG. 16A and FIG. 16B, the brake device 35 is constituted by a brake disc 35*a* which is fixed to the upper portion of the passive axle 34, an upper brake lever 35*b* and a lower brake lever 35*c* which are disposed in opposing positions above and below the brake disc 35*a* and are supported in an openable and closable fashion on the frame of the axle bearing box 32, via supporting pins 35*d*, brake pads 35*e*, 35*e* installed on the upper and lower brake levers 35*b*, 35*c*, which oppose the front surface and the rear surface of the brake disc 35*a*, at a prescribed position, and a brake operating mechanism 35*f* which mutually couples the free end sections of the upper and lower brake levers 35*b*, 35*c*, and also impels same in the closing direction. The brake operating mechanism 35*f* is constituted by a coupling axle which is coupled to the upper brake lever 35*b* and passes through the lower brake lever 35*c*, a coil spring, fitted externally onto the coupling axle and interposed between a stopping section of the coupling axle and the lower brake lever 35*c*, which impels the upper brake lever 35b and the lower brake lever 35c in the closing direction, and retractable dust protection cover. Therefore, when the brake release rod 59 is not acting, and the first drive device 7 or the second drive device 8 are not connected, then the upper and lower brake levers 35b, 35c are impelled in the closing direction by the brake operating mechanism 35f, the brake discs 35a are gripped between the brake pads 35e, 35e, and the passive axle 34 is locked.

Moreover, the brake release mechanism 36 is constituted by a release cam 36a supported on a horizontal pin 36b between the free ends of the upper and lower brake levers 35b, 35c, a drive lever 36c installed on the horizontal pin 36b and capable of rotating the release cam 36a, and a passive roller 36d, installed on the upper end section of the drive lever 36c, against which the pressing face 59f of the brake release rod 59 abuts.

Therefore, when the accompanying truck 2A, 2B is coupled to a conveyance truck 1 by means of the docking device 42, and the first drive device 7 is disposed above the first passive device 25, then as illustrated in FIG. 12, the supporting frame 54 is lowered by the raising and lowering projecting and retreating device 51, via the withdrawing frame 52, and the lower end of the positioning rod 58 is fitted into the open portion of the positioning socket 37. Next, as illustrated in FIG. 13, if the engaging body 57 is rotated slowly by the first rotational drive device 56, via the extension drive axle 55, whilst the supporting frame 54 is lowered by means of the raising and lowering projecting and retreating device 51, then as illustrated in FIG. 14, the coupling hole 57c of the engaging body 57 engages with the engaging axle section 33 of the passive axle 34, simultaneously with the positioning rod 58 engaging with the positioning socket 37. In this case, moreover, the pressing face 59f of the brake release rod 59 abuts against the passive roller 36d. If the withdrawing frame 52 is lowered further by the raising and lowering projecting and retreating device 51, then the passive roller 36d is pressed downwards by the brake release rod 59, the release cam 36a is rotated via the cam lever 36c and the horizontal pin 36b, and the upper and lower brake levers 35b, 35c are opened by the release cam 36a, thereby releasing the brake.

Even if the withdrawing frame 52 is lowered further in this case, the extension drive axle 55 is compressed against the force of the coil spring 55e, and the positioning rod 58 absorbs the distance of downward movement, by means of the supporting frame 54 descending against the compression coil spring 58d. Furthermore, if the first drive device 7 is released from the first passive device 25, then the brake release mechanism 36 assumes a non-operational state by means of the brake release rod 59 being withdrawn, the brake operating mechanism 35f is activated, and the passive axle 34 is locked by the brake device 35.

In this description, in the case of the second drive device 8, it is taken that the first rotational drive device 56 is read to be the second rotational drive device 56.

Description of the Operation

The operation of a coating line apparatus having the aforementioned composition is described with reference to FIG. 4, and the like.

In a state where a vehicle body M is held in an upper conveyance position by the supporting member 4, the conveyance trucks 1 are respectively moved along the coating line R by the truck travel device 9. When a conveyance truck 1 arrives before the processing liquid tank D, the conveyance truck 1 is coupled via the docking device 42 to an accompanying truck 2A which is waiting at the entrance side of the tank. Moreover, the first and second drive devices 7, 8 are lowered and positioned by means of the positioning rods 58, the engaging bodies 57 of the respective extension drive axles 55 engage respectively with the engaging axle section 33 of the passive axle 34, and furthermore, the brake release mechanism 36 is operated by the brake release rod 59, thereby releasing the brake device 35.

The second rotational drive device 56 of the second drive device 8 is activated, the passive axle 34 is rotated by the extension drive axle 55, via the engaging body 57 and the engaging axle section 33, and the inner axle 12i of the support axle 12 is rotated. When the inner axle 12i is rotated, the fourth axles 19 are caused to rotate by means of the wound transmission mechanisms of the angular position adjusting device 5 installed inside the first arms 13 and the second arms 14, and hence the supporting member 4 rotates about the fourth axles 19. By this means, the vehicle body M in conveyance angular position S0 is changed to an introduction angular position S1 wherein (for example) the front portion of the vehicle body M is in a lower position, in accordance with the shape of the vehicle body. In this introduction angular position S1, depending on the shape of the vehicle body, the maximum angle of inclination of the introduction angular position Sm is 90°, as shown in FIG. 4.

The first rotational drive device 56 of the first drive device 7 is activated, and the bearing axle 34 is rotated by the rotation of the extension drive axle 55, via the engaging body 57 and the engaging axle section 33. Moreover, the rotating lever 28 is driven in a push/pull action by the screw axle drive mechanism 27 of the lever type rotating section 25b, and the outer tubular axle section 12o of the support axle 12 is rotated via the passive lever 21. Thereby, the first arms 13 and the second arms 14 of the swinging link mechanisms 3 are rotated downwards, in addition to which, the second arms 14 are caused to rotated in the same direction as the first arms 13, by means of the action of the third arms 15, until the axis line L3 of the third arms passes beyond the transition point P, and the fourth axles 19 which support the supporting member 4 are lowered along the upper movement path Lu.

Moreover, the first arms 13 and the second arms 14 are rotated downwards by the first drive device 7, via the first passive device 25, and when the axis line L3 of the third arms has rotated downwards and passed beyond the transition point P, then the second arms 14 are caused to rotate in the opposite direction to the first arms 13, by the action of the third arms 15, and the fourth axles 19 which support the supporting member 4 are lowered in a substantially vertical direction, following the lower movement path Ld. The vehicle body M is then introduced into the processing liquid, in the introduction angular position S2. If the introduction angular position S2 is an appropriate one, then scattering and rippling of the processing liquid is controlled and the vehicle body M will be immersed satisfactorily. Moreover, whilst the vehicle body M is lowered into the processing liquid, the angular position of the vehicle body M is adjusted by means of the second drive device 8, and the angular position thereof is controlled from the introduction angular position S3, to an immersion angular position S4 in which it is almost horizontal. Thereby, it is possible to immerse the whole of the vehicle body M completely, even if the depth of the processing liquid in the processing liquid tank D is shallow, and consequently, the processing liquid tanks D can be formed to shallow dimensions.

Whilst the conveyance truck 1 and the accompanying truck 2A are caused to travel along the coating line R, by means of the truck travel device 9, the immersion angular position S4 of the vehicle body M which is immersed in the processing liquid in the processing liquid tank D is controlled appropriately by means of the second drive device 8. When the accompanying truck 2A on the entrance side reaches the movement limit, the docking device 42 is released by the returning cam 39, and the accompanying truck 2A on the entrance side is separated from the conveyance truck 1.

In a similar manner, the conveyance truck 1 is coupled to an accompanying truck 2B in the intermediate position by the docking device 42, and the conveyance truck 1 and the intermediately positioned accompanying truck 2B are caused to travel simultaneously along the coating line R, by means of the truck travel device 9, during which time the immersion angular position S4 is controlled by adjusting the angular position of the vehicle body M which is immersed in the processing liquid in the processing liquid tank D, by means of the second drive device 8. Thereby, trapped air that has collected inside the vehicle body M is released, the processing liquid is able to contact the surface of the vehicle body M without any contact failures, and therefore the whole of the vehicle body M is processed in a uniform manner. When the accompanying truck 2B in the intermediate position reaches the movement limit, the docking device 42 is released by the returning cam 27, and the accompanying truck 2B in the intermediate position is separated from the conveyance truck 1.

Furthermore, in a similar manner, the conveyance truck 1 is coupled to the accompanying truck 2A on the output side by the docking device 42, and then travels with same. The angular position control device 5 is operated by the second drive device 8, and the vehicle body M is set to a removal angular position (not illustrated) wherein the vehicle body M is inclined with the front section in an upper position, whereupon the first arms 13 and the second arms 14 of the swinging link mechanisms 3 are caused to rotate upwards by the first drive device 7, and the vehicle body M is removed from the processing liquid. Furthermore, until the axis line L3 of the third arms passes beyond the transition point P, the second arms 14 are rotated in an opposite direction to the first arms 13, by the action of the third arms 15, and the fourth axles 19 are raised in a substantially vertical direction, following the lower movement path Ld, whereby the vehicle body M is removed from the processing liquid in the processing liquid tank D.

In a similar manner, the conveyance truck 1 is coupled to an accompanying truck 2B in the intermediate position by the docking device 42, and the conveyance truck 1 and the intermediately positioned accompanying truck 2B are caused to travel simultaneously along the coating line R, by means of the truck travel device 9, during which time the immersion angular position S4 is controlled by adjusting the angular position of the vehicle body M which is immersed in the processing liquid in the processing liquid tank D, by means of the second drive device 8. Thereby, trapped air that has collected inside the vehicle body M is released, the processing liquid is able to contact the surface of the vehicle body M without any contact failures, and therefore the whole of the vehicle body M is processed in a uniform manner. When the accompanying truck 2B in the intermediate position reaches the movement limit, the docking device 42 is released by the returning cam 39, and the accompanying truck 2B in the intermediate position is separated from the conveyance truck 1.

As shown in FIG. 8, the conveyance angular position in this case is such that the processing liquid adhering to the second arms 14 flows towards the bend section 14b and then drops into the processing liquid tank D. Consequently, the processing liquid does not flow onto the support axle 12, and soiling of the conveyance truck 1 is prevented.

Furthermore, in the conveyance angular position, since the open spaces Q between the supporting sections 4c can be opened up, then it is possible to introduce the fork members of a withdrawing and transporting device into these open spaces Q, with respect to the vehicle body M in the conveyance angular position, and hence to transfer the vehicle body M, from or to the truck, readily.

When the accompanying truck 2A on the output side reaches the movement limit, the docking device 42 is released by the returning cam 39, and the accompanying truck 2A on the output side is separated from the conveyance truck 1.

In the embodiment described above, three accompanying trucks 2A, 2B are disposed with respect to one processing liquid tank D, but in the case of a processing liquid tank D for washing, for instance, a composition is adopted wherein the lowering and raising operations, into and out of the processing liquid, and the introduction angular position and the removal angular position are adjusted by means of a single accompanying truck 2A. The introduction and removal operations in this case are the same as those described above, with the exception of the docking operations with the accompanying trucks 2A, 2B, and the operation of controlling the immersion angular position in the intermediate position.

Furthermore, an introduction angular position is assumed by operating the angular position adjusting device 5, before starting the lowering operation in order to introduce the vehicle body into the liquid, but it is also possible to assume an introduction angular position by operating the angular position adjustment device 5 simultaneously with the time at which the vehicle body M comes into contact with the surface of the processing liquid.

Beneficial Effects of the Embodiment

According to the embodiment described above, a. by means of the swinging link mechanisms 3 constituted by the first arms 13 which are supported on the conveyance truck 1, swingably about a support axle 12, the second arms 14 which are supported on the free end sections of the first arms 13, and the third arms which control the rotation of the second arms, a composition is adopted whereby a vehicle body M held on the supporting member 4 on the free end sections of the swinging link mechanisms 3 is raised and lowered following a lower movement path Ld in a substantially vertical direction, and therefore, it is possible to determine the lowering position of the vehicle body M with high accuracy, and in comparison to a case where the vehicle body M is introduced into and removed from a processing liquid by following an arc-shaped path of travel, for example, it is possible to control the introduction position into the processing liquid in the processing liquid tank D, and the position of removal of same from the processing liquid, readily, in an accurate manner. Moreover, it is also possible to shorten the length of the processing liquid tank D in the direction of the coating line R.

b. As the fixed end sections of the third arms 15 are supported in a position below the support axle 12 and to the front thereof in the direction of travel, and the third arms 15 are caused to move in a reciprocal fashion whereby the axis line L3 of the third arms moves in an upward and downward direction containing a transition point P, then when the axis line L3 of the third arms is below the transition point P and the first arms 13 are caused to rotate, the second arms 14 are caused to rotate in the same direction as the first arms 13, and hence it is possible to lower the support axle 4 following a lower movement path Lu which traces a substantially vertical direction. Consequently, it is possible to achieve a raising and lowering movement of the vehicle body M in a substantially vertical direction, by means of swinging link mechanisms 3 having a simple structure consisting of a combination of first and third arms 13–15. In comparison with a raising and lowering movement which follows an arc-shaped direction as in the prior art, or the like, the position of the vehicle body M can be controlled readily, without complicated correctional control for controlling the movement of the vehicle body M, and hence maintenance characteristics are good.

Furthermore, in the upper movement path Lu wherein the vehicle body M is transferred, it is possible to move in a horizontal direction within a range that is smaller than the arc-shaped path of travel r, and hence interference between the supporting member 4 and the vehicle body M and other members. Accordingly, it is possible to achieve a long raising and lowering stroke H for the vehicle body M, by means of the swinging link mechanisms 3, in the upper movement path Lu and the lower movement path Ld.

Furthermore, since an angular position adjusting device 5 is provided which controls the angular position of the vehicle body M by rotating the supporting member 4 about the fourth axles 19, then the introduction and removal positions with respect to the processing liquid, and the introduction and removal angular positions, are controlled in accordance with the shape of each individual vehicle body M, and hence satisfactory processing is carried out by means of a suitable angular position of the vehicle body M which corresponds to the shape of the vehicle body, and an inclined introduction angular position and removal angular position.

c. Since a pair of swinging link mechanisms 3 are provided on the support axle 12, the supporting member 4 is supported rotatably about the fourth axles 19 between the free end sections of the swinging link mechanisms 3, and an angular position adjusting device 5 for adjusting the angular position of the conveyed object is provided, then it is possible to support the vehicle body M in a stable fashion by means of the supporting member 4, in addition to which the operations of raising and lowering the vehicle body M and the operation of adjusting the angular position can be controlled separately. Furthermore, the supporting member 4 supported rotatably about the fourth axles 19 has a broad range of rotation, being capable of rotating through 360° about the fourth axles 19, and therefore it is possible to maintain a large degree of freedom in adjusting the angular position of the vehicle body M.

d. Since the vehicle body M is introduced into the processing liquid in the processing liquid tank D in an introduction angular position which corresponds to the shape of the vehicle body, for example, in an introduction angular position where the vehicle body M is inclined such that the front portion thereof is in a lower position, by means of the angular position adjusting device 5, then it is possible to achieve a stable introduction operation, whilst preventing dispersion of the processing liquid and the generation of bubbles in same. Furthermore, by controlling the angular position of the vehicle body, during the introduction operation, by means of the angular position adjusting device 5, from the introduction angular position where it is inclined, to a substantially horizontal immersion angular position, then it is possible to introduce the vehicle body M completely into the processing liquid, even in the case of a shallow processing liquid tank D. Furthermore, by controlling the immersion angular position by means of the angular position adjusting device 5, it is possible to eliminate trapped air that has collected inside the vehicle body M, and hence the processing liquid contacts the surface of the vehicle body M in a uniform manner, and satisfactory processing can be carried out. Moreover, by setting the vehicle body M to assume a removal angular position which corresponds to the shape of the vehicle body, by means of the angular position adjustment device 5, it is possible effectively to prevent dispersion of the processing liquid and irregularities in processing, and furthermore, by adjusting the angular position thereof during removal from the liquid, it is possible to raising and lower screw axle 27a is rotated due to the motive force from the passive section 25a, then the female screw member 27b moves in the direction of travel, the rotating lever 28 is pushed, and hence the outer tubular axle 12o is caused to rotate by means of the passive lever 21.

The passive section of the second passive device 26 has the same composition as the passive section 25a of the first passive device 25, and hence description thereof is omitted here.

As shown in FIG. 15A, FIG. 15B, FIG. 16A and FIG. 16B, the brake device 35 is constituted by a brake disc 35a which is fixed to the upper portion of the passive axle 34, an upper brake lever 35b and a lower brake lever 35c which are disposed in opposing positions above and below the brake disc 35a and are supported in an openable and closable fashion on the frame of the axle bearing box 32, via supporting pins 35d, brake pads 35e, 35e installed on the upper and lower brake levers 35b, 35c, which oppose the front surface and the rear surface of the brake disc 35a, at a prescribed position, and a brake operating mechanism 35f which mutually couples the free end sections of the upper and lower brake levers 35b, 35c, and also impels same in the closing direction. The brake operating mechanism 35f is constituted by a coupling axle which is coupled to the upper brake lever 35b and passes through the lower brake lever 35c, a coil spring, fitted externally onto the coupling axle and interposed between a stopping section of the coupling axle and the lower brake lever 35c, which impels the upper brake lever 35b and the lower brake lever position adjustment, and hence a smooth angular position adjustment operation can be achieved.

g. Since a first drive device 7 which drives the swinging link mechanisms 3, and a second drive device 8 which drives the angular position adjusting device 5 are provided on accompanying trucks 2A, 2B which are coupled to the conveyance truck 1 by means of a docking device 42, then it is possible to constitute the conveyance truck 1 in a simple and lightweight fashion. If a plurality of conveyance trucks 1 are disposed in the coating line R, then it is possible significantly to reduce equipment costs.

h. Since the truck travel device 9 is constituted by a pressurized roller type drive device consisting of drive wheels (wheel members) 9a and pressing wheels 9b, then the travel speed, halting, forward or retreat movement (direction of travel) of individual conveyance trucks 1 at prescribed positions on the coating line R can be controlled readily, and furthermore, it is possible to obtain an insulating structure required for electrolytic coating readily, by using an insulating material, such as urethane rubber, or the like, for the wheels.

i. Since the first drive device 7 and the second drive device 8 which respectively drive the swinging link mechanisms 3 and the angular position adjusting device 5 of the conveyance truck 1 are installed on accompanying trucks 2A, 2B that are capable of moving simultaneously with respect to the processing liquid tank D, and the driving force is transmitted via the passive section 25a of the first passive device 25, and the second passive device 26, disposed in the conveyance truck 1, then it is possible to reduce equipment costs significantly, in comparison to a case where individual drive devices are installed respectively in each of the conveyance trucks, as in the prior art.

Furthermore, since the first drive device 7 and the second drive device 8 are provided only in the accompanying trucks 2A which correspond to the entrance and the exit and only the second drive device 8 is provided in the accompanying trucks 2B in the intermediate position, of the accompanying trucks 2A, 2B disposed with respect to the processing liquid tank D, then this contributes to reducing equipment costs. Moreover, the accompanying trucks 2A, 2B disposed with respect to the processing liquid tank D are respectively positioned on the entry side, the exit side and the intermediate position of the processing liquid tank D, and they move reciprocally in a shuttle fashion in synchronism with the conveyance truck 1, and hence it is possible to immerse the vehicle bodies M respectively held on a plurality of conveyance trucks 1, simultaneously, into a processing liquid tank D, and to process same, thereby enabling the cycle time of the accompanying trucks 2A, 2B (and in particular, the movement time in the return path) to be shortened.

It is also possible to compose the forward and backward movement of the accompanying trucks 2A, 2B which travel in a shuttle fashion, in such a manner that the plurality of accompanying trucks travel in a circulatory fashion, from the entry side, to the intermediate position and to the output side, in a successive fashion.

j. Since the passive levers 21 are provided projecting in a forward direction from the support axle 12, on either side of the swinging link mechanisms 3, and a balancing weight 22 is provided on the free end sections of each passive lever 21, then it is possible to reduce the travel pitch between a conveyance truck 1 and adjacent conveyance trucks 1 to the front and rear thereof, whilst preventing the balancing weights 22 from interfering with the vehicle body M held on the conveyance truck 1 which travels in an adjacent position in front of same. In this way, the overall length of the coating line R, and the length of the processing liquid tank D in the direction of travel can be shortened.

k. In a structure where engaging bodies 57 of a first and a second drive device 7, 8 engage respectively with a passive section 25a of a first passive device 25, and an engaging axle section 33 of a second passive device 26, a brake device 35 is provided which locks the passive axle 34 when the bodies are not engaged, and a brake release mechanism 36 is provided for release by means of a brake release rod 59 when the bodies are engaged, whereby drive power can be transmitted smoothly from the first and second drive devices 8, 8 of the accompanying trucks 2A, 2B, to the first and second passive devices 25, 26.

l. Since the support axle 12 is formed in a dual-axle fashion, by means of the inner axle 12i and the outer axle 12o, an angular position adjusting device 5 being composed by coupling the inner axle 12i with fourth axles 19 at the free end sections of the second arms 14, by means of wound coupling mechanisms, and these wound coupling mechanisms being constituted by sprockets 5a, 5d, 5e, chains 5c, 5g, and arc-shaped guides 5f installed inside the first arms 13 and the second arms 14, then drive power input to the inner axle 12i from the second drive device 8, by means of the second passive device 26, can be transmitted to the fourth axle 19, via the wound coupling mechanism, and hence the supporting member 4 can be caused to rotate. Consequently, it is possible to maintain smooth operation, without the inner axle 12i and the wound coupling mechanism being exposed externally, and without them coming into contact with the processing liquid or become soiled by same, and hence maintenance costs can be reduced.

What is claimed is:

1. A conveyance method for a processing step wherein, when a movable body is caused to move along a processing line in which processing liquid tanks are disposed at prescribed positions, a supporting body is raised and lowered by means of a swinging link mechanism provided swingably in the upward and downward directions about a support axle on the movable body, and a conveyed object supported on the supporting body is introduced into a processing liquid in a processing liquid tank and the conveyed object is thereby processed;

in the swinging link mechanism, a first arm supported rotatably in the upward and downward direction on the support axle is caused to rotate in the upward and downward direction, in addition to which a second arm supported rotatably on the free end section of the first arm is rotated by means of a third arm coupled to the movable body and a prescribed position of the second arm, and the supporting body provided on the free end section of the second arm is raised and lowered following a movement path that traces a substantially vertical direction, thereby introducing same into, and removing same from, the processing liquid in the processing liquid tank.

2. The conveyance method for a processing step according to claim 1, wherein, at the entrance to the processing liquid tank, the supporting body is rotated and the conveyed object is set to an introduction attitude where it is inclined in the front/rear direction, and is also introduced into the processing liquid in the processing liquid tank by means of the swinging link mechanism;

the supporting body is rotated and the conveyed object is adjusted to a substantially horizontal immersion attitude, at an intermediate position of the processing liquid tank over which the movable body is traveling; and at the exit from the processing liquid tank, the supporting body is rotated and the conveyed object is set to a removal attitude where it is inclined in the front/rear direction, and is removed from the processing liquid in the processing liquid tank by means of the swinging link mechanism.

3. A conveyance apparatus for a processing steps comprising:

a movable body capable of moving along a processing line including a processing liquid tank disposed at a prescribed position;

a swinging link mechanism provided on the movable body and including a supporting body for holding a conveyance object;

a travel drive device for driving the movable body; and a first drive device for operating the swinging link mechanism, characterized by said swinging link mechanism comprising:

a first arm having a fixed end section rotatably supported on the movable body by means of a support axle;

a second arm having a fixed end section rotatably supported to a free end section of the first arm;

a supporting body provided at a free end section of the second arm; and a third arm rotatably connected between the movable body and a prescribed position of the second arm, said third arm having a fixed end section being supported by a second axle having a fixed end section located below the support axle and ahead of the support in a running direction of the movable body, and a free end section connected close to the fixed end section of the second arm by means of a third axle.

4. The conveyance apparatus for a processing step according to claim 3, wherein the second arm is caused to rotate in the opposite direction to the first arm, with respect to the rotation of the first arm, by means of the third arm, and the supporting body is moved in a substantially vertical direction along a lower movement path.

5. The conveyance apparatus for a processing step according to claim 4, wherein the supporting body is supported rotatably via a free end axle on the free end section of the second arm, and the axis center of the free end axle is disposed in a position passing in the proximity of the center of gravity of the conveyed object supported on the supporting body;

an attitude adjustment device is provided whereby the attitude of the conveyed object is adjusted by means of the supporting body being rotated about the free end axle; and the attitude adjustment device comprises transmission mechanisms, that couple together the support axle and the free end axle, installed inside the first arm and the second arm, drive force being input thereto from the support axle.

6. The conveyance apparatus according to claim 5, wherein the second arm is formed into an L-shape in side view, by a fixed end side linear section, a bend section and a free end side linear section;

the second arm adopting an attitude where the fixed end side linear section is in an inclined attitude where it is higher than the bend section, and the free end side linear section is in an inclined attitude or a vertical attitude where it is higher than the bend section, when the swinging link mechanism is in the upward rotational position, with the conveyed object raised up.

7. The conveyance apparatus for a processing step according to claim 5, wherein accompanying trucks capable of moving in synchronism with the movable body are provided, and a second drive device for operating the first drive device and the attitude adjusting device is provided in the accompanying trucks; and a first passive device to which drive force is transmitted from the first drive device, and a second passive device to which drive force is transmitted from the second drive device, are provided in the movable body.

8. The conveyance apparatus for a processing step according to claim 5, wherein accompanying trucks capable of moving in synchronism with the movable body are provided, and a second drive device for operating the first drive device and the attitude adjusting device is provided in the accompanying trucks; and a first passive device to which drive force is transmitted from the first drive device, and a second passive device to which drive force is transmitted from the second drive device, are provided in the movable body;

a plurality of accompanying trucks being provided along the processing line corresponding to a processing liquid tank;

a first brake device for locking the swinging link mechanism, and a first brake release device for releasing the first brake device when the first drive device is coupled, being provided in the first passive device; and a second brake device for locking the attitude adjusting device, and a second brake release device for releasing the second brake device when the second drive device is coupled, being provided in the second passive device.

9. The conveyance apparatus for a processing step according to claim 5, wherein accompanying trucks capable of moving in synchronism with the movable body are provided, and a second drive device for operating the first drive device and the attitude adjusting device is provided in the accompanying trucks; and a first passive device to which drive force is transmitted from the first drive device, and a second passive device to which drive force is transmitted from the second drive device, are provided in the movable body;

the second passive device being coupled to an inner axle installed inside an outer tubular axle in the support axle; and the inner axle being coupled to the transmission mechanisms of the attitude adjustment device.

10. The conveyance apparatus for a processing step according to claim 4, wherein a pair of swinging link mechanisms are provided at a prescribed interval apart, on the support axle; and the supporting body is supported rotatably about the horizontal axis, between the free end sections of the swinging link mechanisms.

11. The conveyance apparatus for a processing step according to claim 4, wherein counterbalance weights are provided respectively on either side of the swinging link mechanism of the support axle via lever members; and the counterbalance weights are disposed on the outer side of the conveyed object supported on the supporting body of the movable body that moves adjacently in the direction of travel.

12. The conveyance apparatus for a processing step according to claim 3, wherein the third arm is supported in a reciprocally rotatable fashion on the movable body, within a range wherein the axis line of the third arm, that links the fixed end section and the free end section thereof, may move both above and below a transition point that passes through the support axle; and if the axis line of the third arm is rotated below the transition point, the second arm is caused to rotate in the opposite direction to the first arm, by means of the third arm, with respect to the rotation of the first arm, and the lower movement path of the supporting body follows a substantially vertical direction, whereas if the axis line of the third arm is rotated above the transition point, the second arm is caused to rotate in the same direction as the first arm, by means of the third arm, with respect to the rotation of the first arm, the distance of horizontal travel of the supporting body in the upper movement path being shorter than the distance of horizontal travel thereof in an arc-shaped movement path centered on the support axle.

13. The conveyance apparatus for a processing step according to claim 12, wherein the supporting body is supported rotatably via a free end axle on the free end section of the second arm, and the axis center of the free end axle is disposed in a position passing in the proximity of the center of gravity of the conveyed object supported on the supporting body;

an attitude adjustment device is provided whereby the attitude of the conveyed object is adjusted by means of the supporting body being rotated about the free end axle; and the attitude adjustment device comprises transmission mechanisms, that couple together the support axle and the free end axle, installed inside the first arm and the second arm, drive force being input thereto from the support axle.

* * * * *